United States Patent
Back et al.

(10) Patent No.: US 12,047,976 B2
(45) Date of Patent: Jul. 23, 2024

(54) UE OPERATION METHOD RELATED TO DISCOVERY RESOURCE POOL IN WIRELESS COMMUNICATION SYSTEM

(71) Applicant: LG Electronics Inc., Seoul (KR)

(72) Inventors: Seoyoung Back, Seoul (KR); Seungmin Lee, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/364,865

(22) Filed: Aug. 3, 2023

(65) Prior Publication Data

US 2024/0073921 A1 Feb. 29, 2024

Related U.S. Application Data

(60) Provisional application No. 63/398,844, filed on Aug. 17, 2022.

(51) Int. Cl.
*H04W 72/23* (2023.01)
*H04W 72/232* (2023.01)
*H04W 72/40* (2023.01)

(52) U.S. Cl.
CPC ......... *H04W 72/232* (2023.01); *H04W 72/40* (2023.01)

(58) Field of Classification Search
CPC .... H04W 72/40; H04W 72/232; H04W 72/23
See application file for complete search history.

(56) References Cited

U.S. PATENT DOCUMENTS

| | | | | |
|---|---|---|---|---|
| 2021/0168814 A1* | 6/2021 | Chen | | H04W 72/02 |
| 2021/0212148 A1* | 7/2021 | Liang | | H04W 76/14 |
| 2022/0346120 A1* | 10/2022 | Wang | | H04W 72/20 |
| 2022/0346180 A1* | 10/2022 | Tseng | | H04W 76/14 |

(Continued)

FOREIGN PATENT DOCUMENTS

| | | |
|---|---|---|
| CN | 113727300 | 11/2021 |
| JP | 2018-191333 | 11/2018 |

(Continued)

OTHER PUBLICATIONS

ETSI TS 138 331 V17.0.0 (May 2022), Radio Resource Control (RRC) Protocol specification, (3GPP TS 38.331 version 17.0.0 Release 17), May 2022, 1197 pages.

(Continued)

*Primary Examiner* — Chi Ho A Lee
(74) *Attorney, Agent, or Firm* — Fish & Richardson P.C.

(57) ABSTRACT

An embodiments relates to a method of operating a user equipment (UE) in a wireless communication system. The method includes: receiving, by the UE, downlink control information (DCI) from a base station (BS); and, determining, by the UE, a resource pool indicated by a resource pool index in the DCI from among a plurality of resource pools. Based on that resource pools related to New Radio (NR) sidelink discovery and resource pools related to NR sidelink communication transmission are configured together in the plurality of resource pools, the resource pool index indicates one resource pool among all resource pools included in the (Continued)

resource pools related to NR sidelink communication transmission and the resource pools related to NR sidelink discovery.

12 Claims, 21 Drawing Sheets

(56) References Cited

U.S. PATENT DOCUMENTS

| | | | | |
|---|---|---|---|---|
| 2023/0129740 A1* | 4/2023 | Kuo | ............ | H04W 76/14 370/328 |
| 2023/0199803 A1* | 6/2023 | Kang | ............ | H04W 8/005 370/315 |
| 2023/0217441 A1* | 7/2023 | Wang | ............ | H04W 28/26 370/330 |
| 2023/0261797 A1* | 8/2023 | Hahn | ............ | H04L 1/1819 370/329 |
| 2023/0262618 A1* | 8/2023 | Ryu | ............ | H04W 72/0446 370/318 |
| 2023/0284206 A1* | 9/2023 | Hoang | ............ | H04W 72/02 370/329 |

FOREIGN PATENT DOCUMENTS

| | | |
|---|---|---|
| KR | 10-2021-0127100 | 10/2021 |
| KR | 10-2022-0011444 | 1/2022 |
| KR | 10-2022-0090520 | 6/2022 |

OTHER PUBLICATIONS

Search Report in Korean Appln. No. 10-2023-0098154, mailed on Aug. 4, 2023, 5 pages (with English translation).

Extended European Search Report in European Appln. No. 23190846.8, mailed on Nov. 29, 2023, 12 pages.

OPPO, "Correction for SL DRX," 3GPP TSG-RAN2 Meeting#119, R2-2207016, E-meeting, Aug. 15-Aug. 26, 46 pages.

OPPO, "Discussion on remaining issue of sidelink discovery," 3GPP TSG-RAN WG2 Meeting #116bis, R2-2200486, Online, Jan. 17-Jan. 25, 2022, 5 pages.

Vivo, "LS on mode-1 dedicated discovery transmission pool," 3GPP TSG RAN WG2 Meeting #119, R2-2207766, Online, Aug. 2022, 2 pages.

Ericsson, Huawei, "Correction CR for QoE Measurement Collection in NR," 3GPP TSG-RAN WG2 Meeting #119, R2-2207722, Electronical meeting, Aug. 9, 2022, 1258 pages.

Intel Corporation, "Potential solutions for SL positioning," 3GPP TSG RAN WG1 #110, R1-2206589, Toulouse, France, Aug. 22-26, 2022, 15 pages.

Office Action in Korean Appln. No. 10-2023-0098154, mailed on Mar. 7, 2024, 10 pages (with English translation).

ZTE, "Discussion on potential solutions for SL positioning," 3GPP TSG RAN WG1 #110, R1-2205901, Toulouse, France, Aug. 22-26, 2022, 15 pages.

* cited by examiner

UE OPERATION METHOD RELATED TO DISCOVERY RESOURCE POOL IN WIRELESS COMMUNICATION SYSTEM

CROSS-REFERENCE TO RELATED APPLICATION

This application claims the benefit of U.S. Provisional Application No. 63/398,844, filed on Aug. 17, 2022, which is hereby incorporated by reference as if fully set forth herein.

TECHNICAL FIELD

The following description relates to a wireless communication system, and more particularly, to a method and apparatus for operating a user equipment (UE) in relation to aspects related to a discovery resource pool when a discovery message is transmitted in the discovery resource pool.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Accordingly, the present disclosure is directed to a user equipment (UE) operation method related to discovery resource pool in a wireless communication system that substantially obviates one or more problems due to limitations and disadvantages of the related art.

The present disclosure is to provide detailed aspects related to a discovery resource pool, such as indexing of discovery resource pools, when a discovery message is transmitted in the discovery resource pool.

To achieve these objects and other advantages and in accordance with the purpose of the disclosure, as embodied and broadly described herein, there is provided a method of operating a user equipment (UE) in a wireless communication system. The method includes: receiving, by the UE, downlink control information (DCI) from a base station (BS); and, transmitting, by the UE, a sidelink signal based on a resource pool indicated by a resource pool index in the DCI from among a plurality of resource pools. Based on that resource pools related to New Radio (NR) sidelink discovery and resource pools related to NR sidelink communication transmission are configured together in the plurality of resource pools, the resource pool index indicates one resource pool among all resource pools included in the resource pools related to NR sidelink communication transmission and the resource pools related to NR sidelink discovery.

In another aspect of the present disclosure, there is provided a UE in a wireless communication system. The UE includes: at least one processor; and at least one computer memory operably connected to the at least one processor and configured to store instructions that, when executed, cause the at least one processor to perform operations. The operations include: receiving, by the UE, DCI from a BS; transmitting, by the UE, a sidelink signal based on a resource pool indicated by a resource pool index in the DCI from among a plurality of resource pools. Based on that resource pools related to NR sidelink discovery and resource pools related to NR sidelink communication transmission are configured together in the plurality of resource pools, the resource pool index indicates one resource pool among all resource pools included in the resource pools related to NR sidelink communication transmission and the resource pools related to NR sidelink discovery.

In a further aspect of the present disclosure, there is provided a non-volatile computer-readable storage medium configured to store at least one computer program including instructions that, when executed by at least one processor, cause the at least one processor to perform operations for a UE. The operations include: receiving, by the UE, DCI from a BS; transmitting, by the UE, a sidelink signal based on a resource pool indicated by a resource pool index in the DCI from among a plurality of resource pools. Based on that resource pools related to NR sidelink discovery and resource pools related to NR sidelink communication transmission are configured together in the plurality of resource pools, the resource pool index indicates one resource pool among all resource pools included in the resource pools related to NR sidelink communication transmission and the resource pools related to NR sidelink discovery.

A size of all resource pools may be equivalent to a sum of a number of the resource pools related to NR sidelink communication and a number of the resource pools related to NR sidelink discovery.

The resource pools related to NR sidelink discovery may correspond to a dedicated resource pool.

The UE may operate in sidelink transmission mode 1.

The UE may be in a radio resource control connected (RRC_CONNECTED) state.

The resource pools related to NR sidelink communication may be configured by an sl-TxPoolScheduling information element, and the resource pools related to NR sidelink discovery may be configured by an sl-DiscTxPoolScheduling information element.

The DCI may be received over a physical sidelink control channel (PSCCH).

The sidelink signal may be either an NR sidelink communication signal or an NR sidelink discovery signal.

The DCI may be DCI format 3_0.

The UE may communicate with at least one of another UE, a UE or BS related to autonomous vehicles, or a network.

In the prior art, when resource pool allocation is performed at the physical layer, it is only defined for the allocation of communication resource pools. However, according to an embodiment, handing of resource pool indices may be clearly defined when a discovery messages is transmitted in a dedicated resource pool. In addition, when a discovery dedicated resource pool is configured, the total resource pool indices may be determined based on the sum of the number of communication resource pools and the number of dedicated resource pools, thereby enabling the mapping of resource pool identifiers (IDs) such that the ID of a communication resource pool and the ID of a dedicated resource pool do not overlap with each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
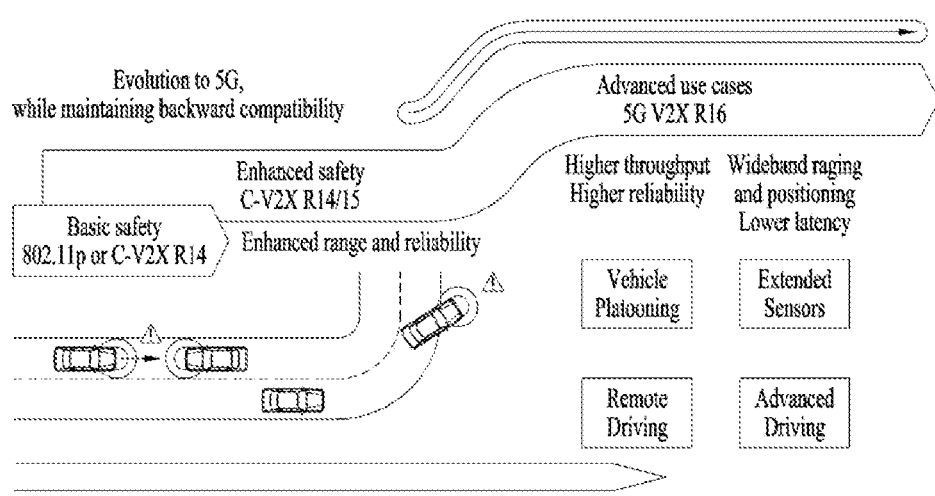
FIG. 1 is a diagram for explaining comparison between vehicle-to-everything (V2X) communication based on pre-new radio (NR) radio access technology (RAT) and V2X communication based on NR.
Figure 2:
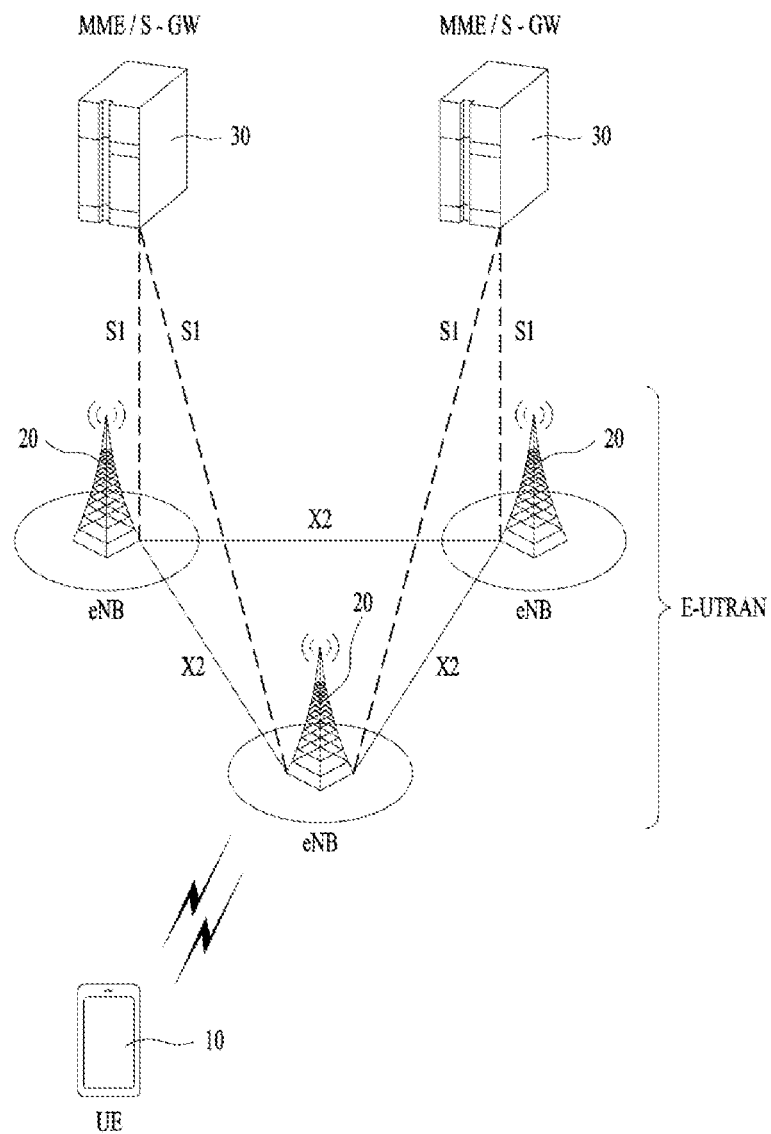
FIG. 2 illustrates the structure of an LTE system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figures 3A, 3B:
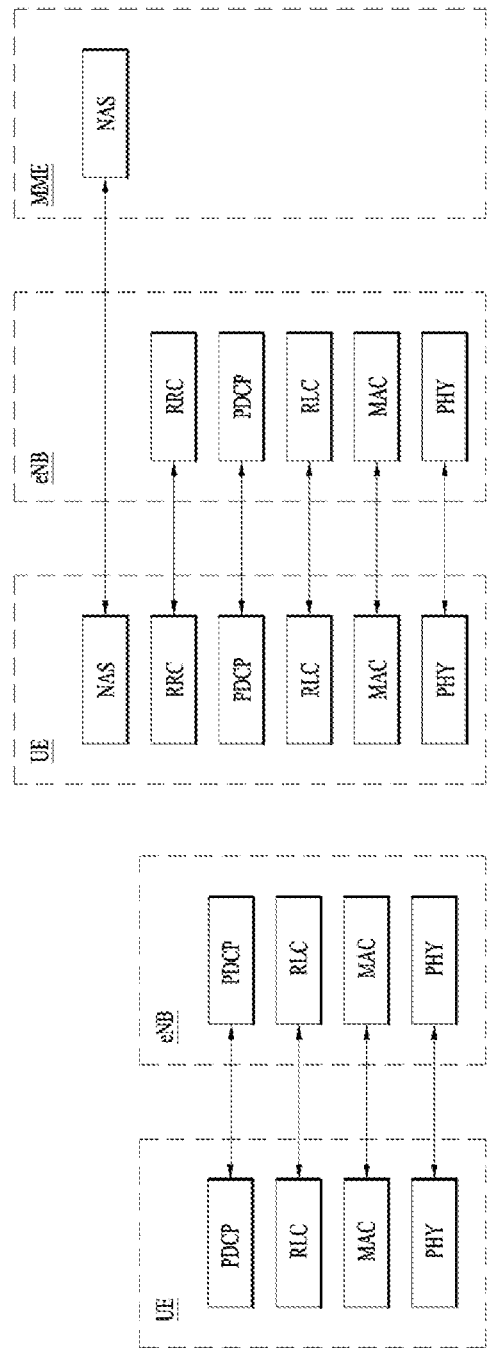
FIGS. 3A and 3B are diagrams illustrating user-plane and control-plane radio protocol architectures according to an embodiment of the present disclosure.

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and 3B, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RB s. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
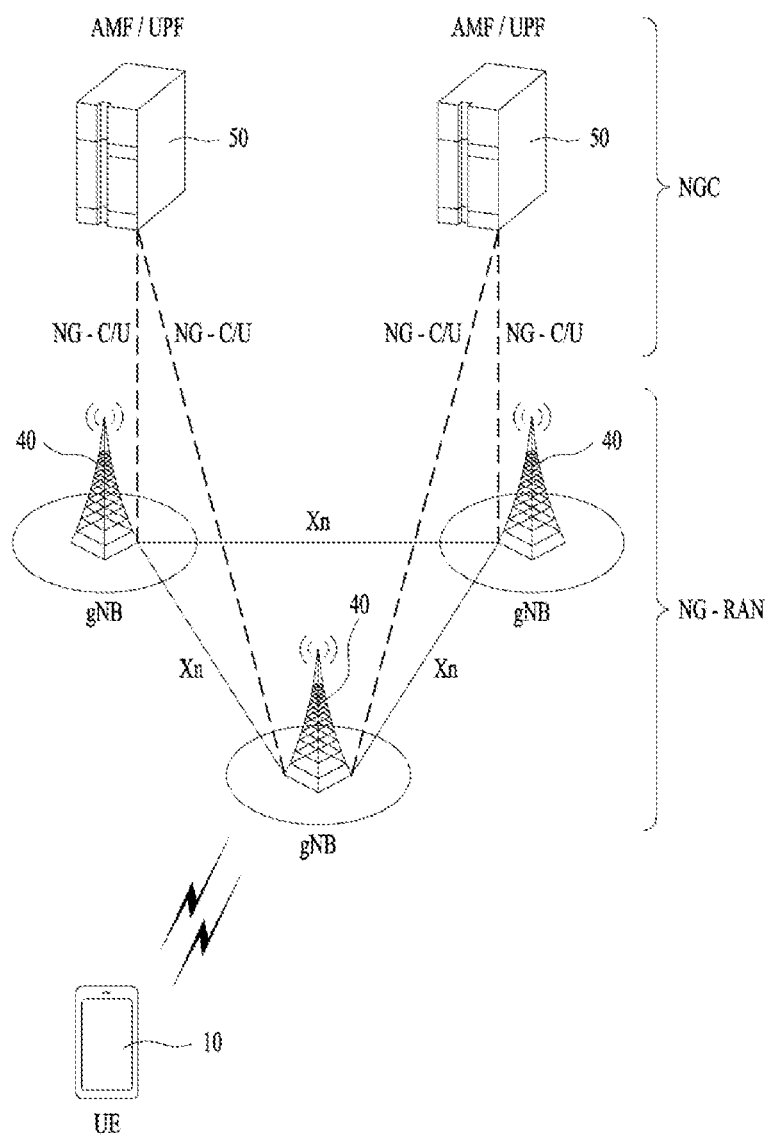
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
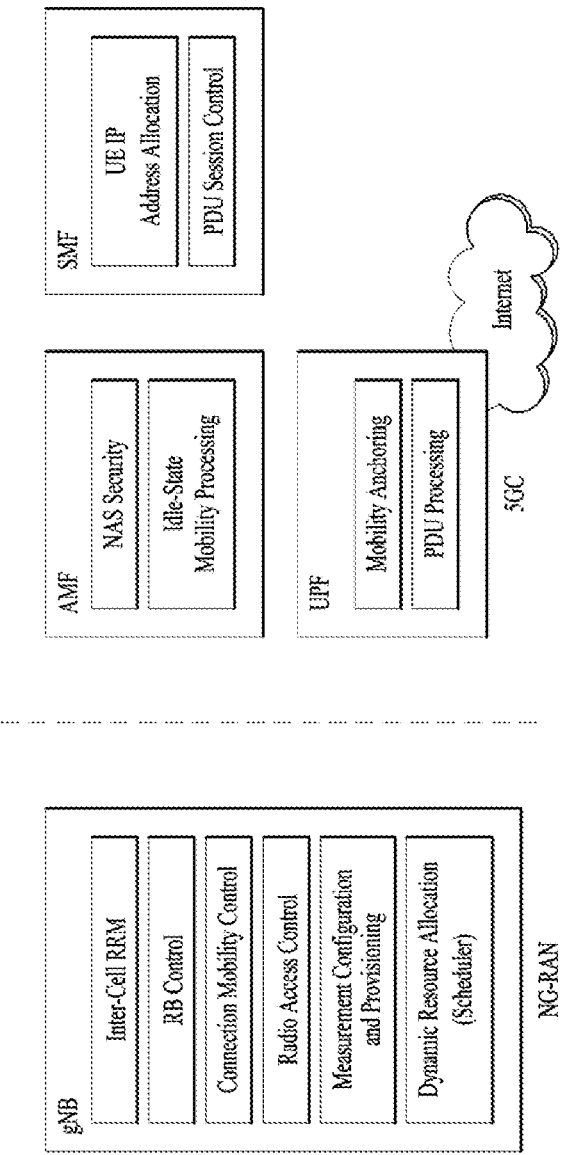
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
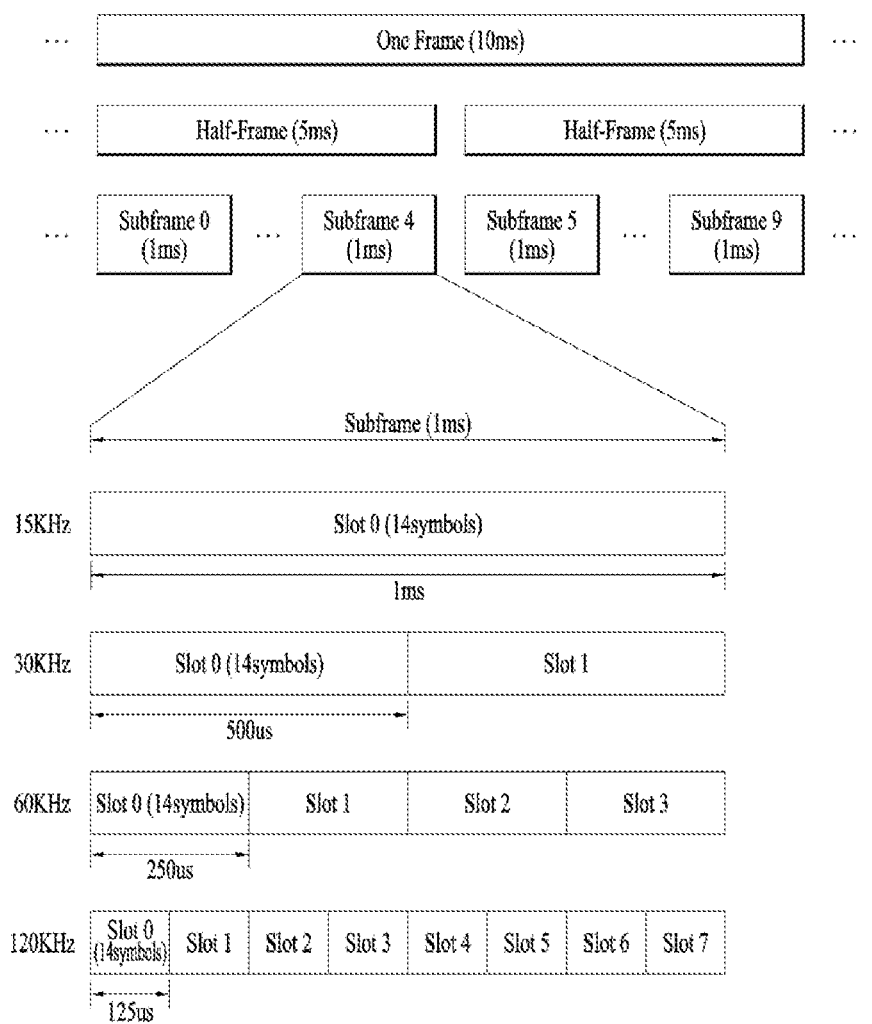
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N_{slot}^{symb}$, the number of slots per frame $N_{frame,u}^{slot}$, and the number of slots per subframe $N_{subframe,u}^{slot}$ according to an SCS configuration µ in the NCP case.

TABLE 1

| SCS (15*2u) | $N_{slot}^{symb}$ | $N_{frame,u}^{slot}$ | $N_{subframe,u}^{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2u) | $N_{slot}^{symb}$ | $N_{frame,u}^{slot}$ | $N_{subframe,u}^{slot}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI)

(collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 KHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
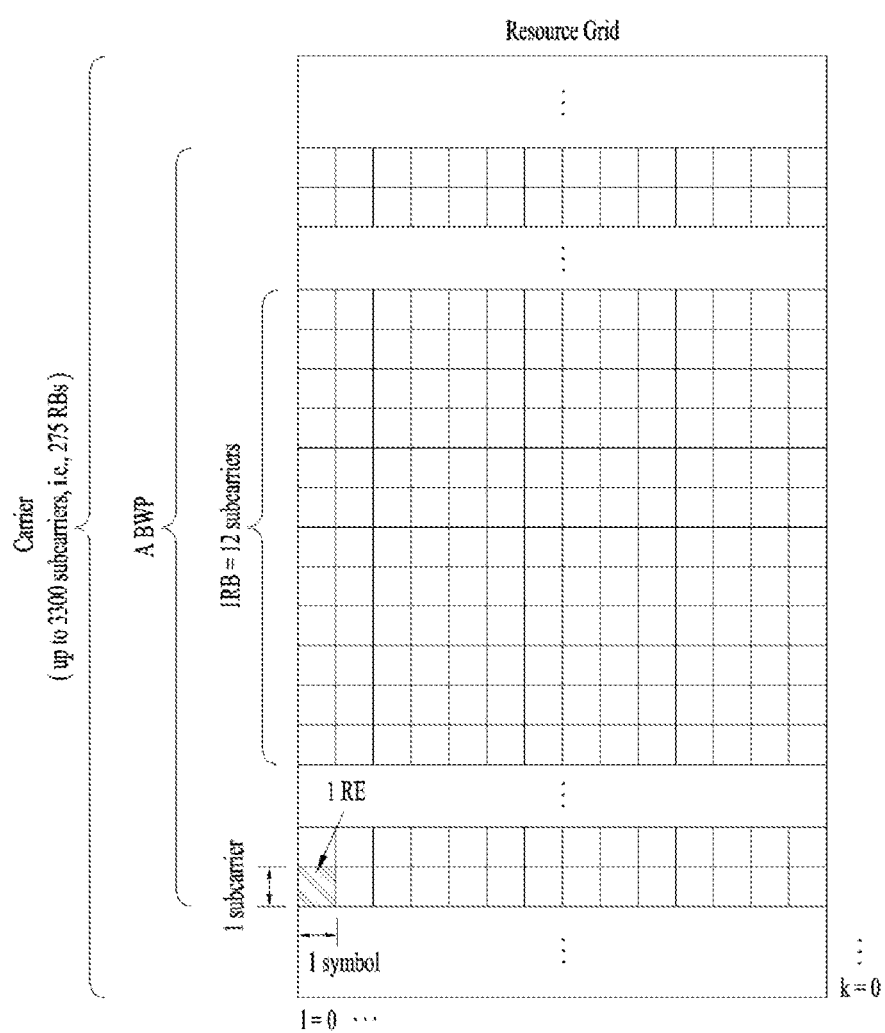
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8A:
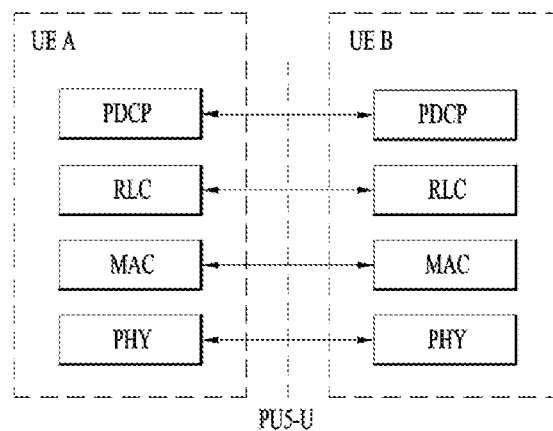
FIGS. 8A and 8B are diagrams illustrating radio protocol architectures for sidelink (SL) communication according to an embodiment of the present disclosure.
Figure 8B:
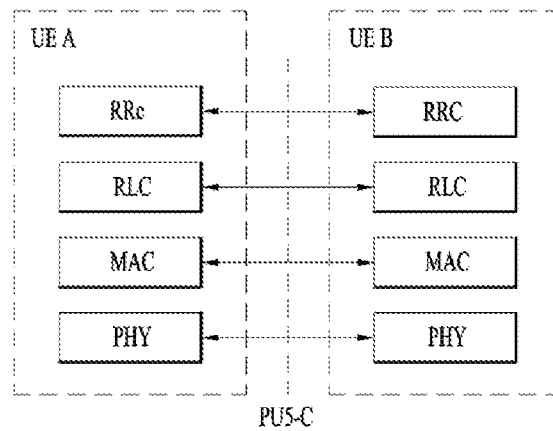

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
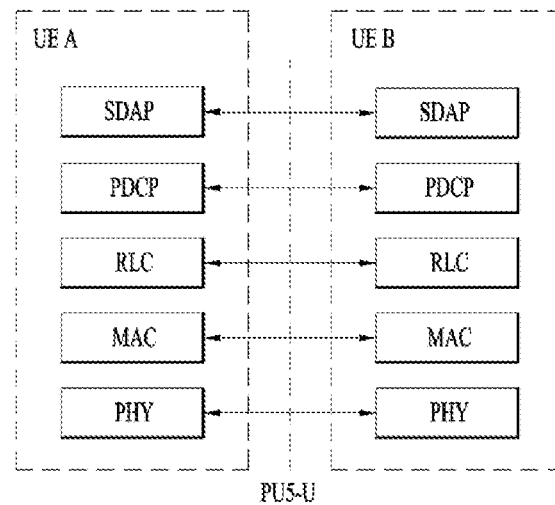
FIGS. 9A and 9B are diagrams illustrating radio protocol architectures.
Figure 9B:
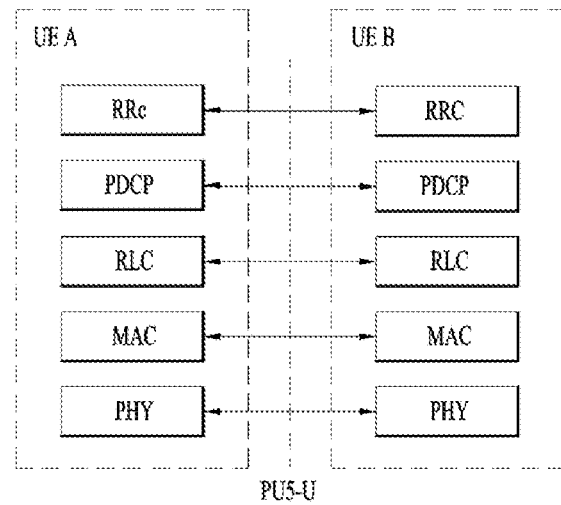

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR.

Figure 10:
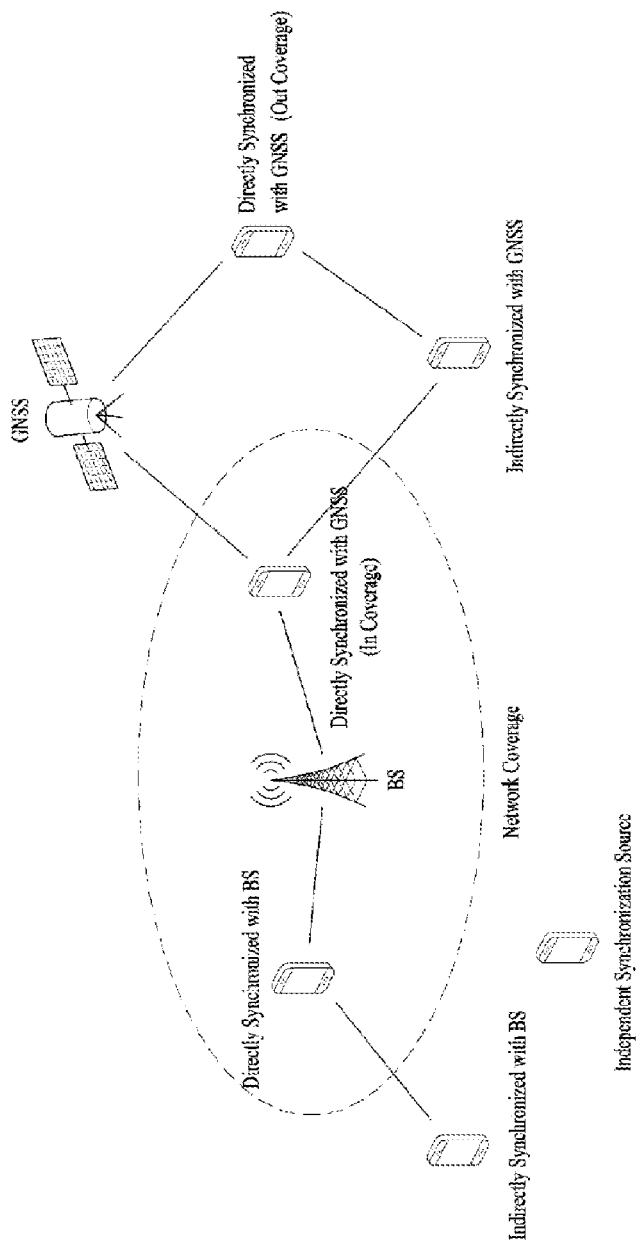
FIG. 10 illustrates a synchronization source or synchronization reference of V2X according to an embodiment of the present disclosure.

FIG. 10 illustrates a synchronization source or synchronization reference of V2X according to an embodiment of the present disclosure.

Referring to FIG. 10, in V2X, a UE may be directly synchronized with global navigation satellite systems (GNSS). Alternatively, the UE may be indirectly synchronized with the GNSS through another UE (within or out of network coverage). If the GNSS is configured as a synchronization source, the UE may calculate a direct frame number (DFN) and a subframe number based on a coordinated universal time (UTC) and a configured (or preconfigured) DFN offset.

Alternatively, a UE may be directly synchronized with a BS or may be synchronized with another UE that is synchronized in time/frequency with the BS. For example, the BS may be an eNB or a gNB. For example, when a UE is in network coverage, the UE may receive synchronization information provided by the BS and may be directly synchronized with the BS. Next, the UE may provide the synchronization information to another adjacent UE. If a timing of the BS is configured as a synchronization reference, the UE may follow a cell associated with a corresponding frequency (when the UE is in cell coverage in frequency) or a primary cell or a serving cell (when the UE is out of cell coverage in frequency), for synchronization and DL measurement.

The BS (e.g., serving cell) may provide a synchronization configuration for a carrier used for V2X/SL communication. In this case, the UE may conform to the synchronization configuration received from the BS. If the UE fails to detect any cell in the carrier used for V2X/SL communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference may be preconfigured for the UE. Alternatively, the synchronization source and the preference may be configured through a control message provided by the BS.

SL synchronization sources may be associated with synchronization priority levels. For example, a relationship between synchronization sources and synchronization priorities may be defined as shown in Table 5 or 6. Table 5 or 6 is merely an example, and the relationship between synchronization sources and synchronization priorities may be defined in various ways.

TABLE 5

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs directly synchronized with GNSS | All UEs indirectly synchronized with GNSS |
| P3 | BS | GNSS |
| P4 | All UEs directly synchronized with GNSS | All UEs directly synchronized with GNSS |
| P5 | All UEs indirectly synchronized with GNSS | All UEs indirectly synchronized with GNSS |
| P6 | Remaining UE(s) with low priority | Remaining UE(s) with low priority |

In Table 5 or 6, P0 may mean the highest priority, and P6 may mean the lowest priority. In Table 5 or 6, the BS may include at least one of a gNB or an eNB.

Whether to use GNSS-based synchronization or eNB/gNB-based synchronization may be (pre)configured. In a single-carrier operation, the UE may derive a transmission timing thereof from an available synchronization reference having the highest priority.

Hereinafter, a sidelink synchronization signal (SLSS) and synchronization information will be described.

As an SL-specific sequence, the SLSS may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may use the S-PSS to detect an initial signal and obtain synchronization. In addition, the UE may use the S-PSS and the S-SSS to obtain detailed synchronization and detect a synchronization signal ID.

A physical sidelink broadcast channel (PSBCH) may be a (broadcast) channel for transmitting default (system) information that the UE needs to know first before transmitting and receiving SL signals. For example, the default information may include information related to an SLSS, a duplex mode (DM), a time division duplex (TDD) UL/DL configuration, information related to a resource pool, an application type related to the SLSS, a subframe offset, broadcast information, etc. For example, for evaluation of PSBCH performance in NR V2X, the payload size of the PSBCH may be 56 bits including a CRC of 24 bits.

The S-PSS, S-SSS, and PSBCH may be included in a block format (e.g., SL synchronization signal (SS)/PSBCH block) supporting periodical transmission (hereinafter, the SL SS/PSBCH block is referred to as a sidelink synchronization signal block (S-SSB)). The S-SSB may have the same numerology (i.e., SCS and CP length) as that of a physical sidelink control channel (PSCCH)/physical sidelink shared channel (PSSCH) on a carrier, and the transmission bandwidth may exist within a configured (or preconfigured) SL BWP. For example, the S-SSB may have a bandwidth of 11 RBs. For example, the PSBCH may span 11 RBs. In addition, the frequency position of the S-SSB may be configured (or preconfigured). Therefore, the UE does not need to perform hypothesis detection on frequency to discovery the S-SSB on the carrier.

The NR SL system may support a plurality of numerologies with different SCSs and/or different CP lengths. In this case, as the SCS increases, the length of a time resource used by a transmitting UE to transmit the S-SSB may decrease. Accordingly, the coverage of the S-SSB may be reduced. Therefore, in order to guarantee the coverage of the S-SSB, the transmitting UE may transmit one or more S-SSBs to a receiving UE within one S-SSB transmission period based on the SCS. For example, the number of S-SSBs that the transmitting UE transmits to the receiving UE within one S-SSB transmission period may be pre-configured or configured for the transmitting UE. For example, the S-SSB transmission period may be 160 ms. For example, an S-SSB transmission period of 160 ms may be supported for all SCSs.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

Figures 11A, 11B:
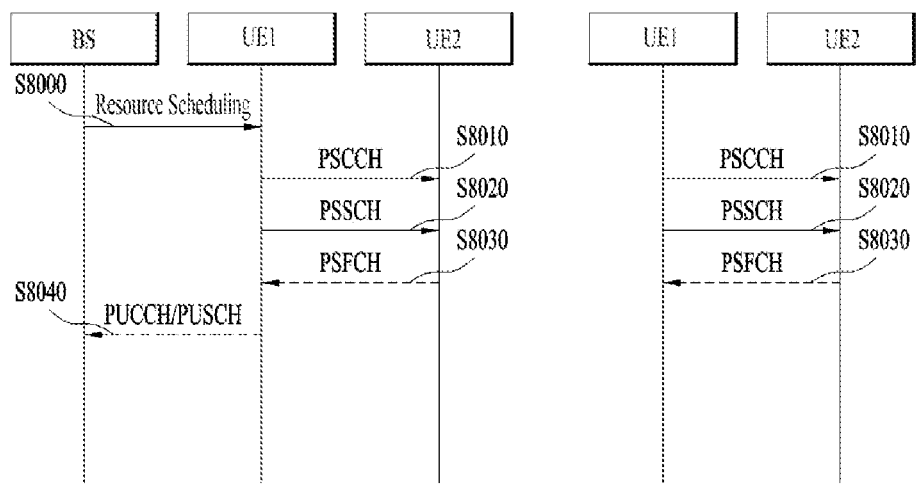
FIGS. 11A and 11B illustrate a procedure for a user equipment (UE) to perform V2X or SL communication depending on transmission modes according to an embodiment of the present disclosure.

FIGS. 11A and 11B illustrate a procedure of performing V2X or SL communication by a UE depending on a transmission mode according to an embodiment of the present disclosure. The embodiments of FIGS. 11A and 11B may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 11A illustrates a UE operation related to LTE transmission mode 1 or LTE transmission mode 3. Alternatively, for example, FIG. 11A illustrates a UE operation related to NR resource allocation mode 1. For example, LTE transmission mode 1 may apply to general SL communication, and LTE transmission mode 3 may apply to V2X communication.

For example, FIG. 11B illustrates a UE operation related to LTE transmission mode 2 or LTE transmission mode 4. Alternatively, for example, FIG. 11B illustrates a UE operation related to NR resource allocation mode 2.

Referring to FIG. 11A, in LTE transmission mode 1, LTE transmission mode 3, or NR resource allocation mode 1, a BS may schedule an SL resource to be used for SL transmission by a UE. For example, in step S8000, the BS may transmit information related to an SL resource and/or information related to a UE resource to a first UE. For example, the UL resource may include a PUCCH resource and/or a PUSCH resource. For example, the UL resource may be a resource to report SL HARQ feedback to the BS.

For example, the first UE may receive information related to a Dynamic Grant (DG) resource and/or information related to a Configured Grant (CG) resource from the BS. For example, the CG resource may include a CG type 1 resource or a CG type 2 resource. In the present specification, the DG resource may be a resource configured/allocated by the BS to the first UE in Downlink Control Information (DCI). In the present specification, the CG resource may be a (periodic) resource configured/allocated by the BS to the first UE in DCI and/or an RRC message. For example, for the CG type 1 resource, the BS may transmit an RRC message including information related to the CG resource to the first UE. For example, for the CG type 2 resource, the BS may transmit an RRC message including information related to the CG resource to the first UE, and the BS may transmit DCI for activation or release of the CG resource to the first UE.

In step S8010, the first UE may transmit a PSCCH (e.g., Sidelink Control Information (SCI) or 1st-stage SCI) to a second UE based on the resource scheduling. In step S8020, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE. For example, HARQ feedback information (e.g., NACK information or ACK information) may be received from the second UE over the PSFCH. In step S8040, the first UE may transmit/report HARQ feedback information to the BS over a PUCCH or PUSCH. For example, the HARQ feedback information reported to the BS may include information generated by the first UE based on HARQ feedback information received from the second UE. For example, the HARQ feedback information reported to the BS may include information generated by the first UE based on a preset rule. For example, the DCI may be a DCI for scheduling of SL. For example, the format of the DCI may include DCI format 3_0 or DCI format 3_1. Table 7 shows one example of DCI for scheduling of SL.

TABLE 7

7.3.1.4.1  Format 3_0
DCI format 3_0 is used for scheduling of NR PSCCH and NR PSSCH in one cell.
The following information is transmitted by means of the DCI format 3_0 with CRC
scrambled by SL-RNTI or SL-CS-RNTI:
   - Resource pool index -$\lceil \log_2 I \rceil$ bits, where I is the number of resource pools for
   transmission configured by the higher layer parameter sl-TxPoolScheduling.
   - Time gap - 3 bits determined by higher layer parameter sl-DCI-ToSL-Trans, as
   defined in clause 8.1.2.1 of [6, TS 38.214]
   - HARQ process number - 4 bits.
   - New data indicator - 1 bit.
   - Lowest index of the subchannel allocation to the initial transmission -
   $\lceil \log_2(N_{subchannel}^{SL}) \rceil$ bits as defined in clause 8.1.2.2 of [6, TS 38.214]
   - SCI format 1-A fields according to clause 8.3.1.1:
     - Frequency resource assignment.
     - Time resource assignment.
   - PSFCH-to-HARQ feedback timing indicator -$\lceil \log_2 N_{fb\_timing} \rceil$ bits, where $N_{fb\_timing}$
   is the number of entries in the higher layer parameter sl-PSFCH-ToPUCCH, as defined
   in clause 16.5 of [5, TS 38.213]
   - PUCCH resource indicator - 3 bits as defined in clause 16.5 of [5, TS 38.213].
   - Configuration index - 0 bit if the UE is not configured to monitor DCI format 3_0
   with CRC scrambled by SL-CS-RNTI; otherwise 3 bits as defined in clause 8.1.2 of [6,
   TS 38.214]. If the UE is configured to monitor DCI format 3_0 with CRC scrambled
   by SL-CS-RNTI, this field is reserved for DCI format 3_0 with CRC scrambled by SL-
   RNTI.
   - Counter sidelink assignment index - 2 bits
     -  2 bits as defined in clause 16.5.2 of [5, TS 38.213] if the UE is configured
     with pdsch-HARQ-ACK-Codebook = dynamic
     -  2 bits as defined in clause 16.5.1 of [5, TS 38.213] if the UE is configured
     with pdsch-HARQ-ACK-Codebook = semi-static
   - Padding bits, if required
If multiple transmit resource pools are provided in sl-TxPoolScheduling, zeros shall be
appended to the DCI format 3_0 until the payload size is equal to the size of a DCI format
3_0 given by a configuration of the transmit resource pool resulting in the largest number of
information bits for DCI format 3_0.
If the UE is configured to monitor DCI format 3_1 and the number of information bits in
DCI format 3_0 is less than the payload of DCI format 3_1, zeros shall be appended to DCI
format 3_0 until the payload size equals that of DCI format 3_1.
7.3.1.4.2  Format 3_1
DCI format 3_1 is used for scheduling of LTE PSCCH and LTE PSSCH in one cell.
The following information is transmitted by means of the DCI format 3_1 with CRC
scrambled by SL Semi-Persistent Scheduling V-RNTI:
   - Timing offset - 3 bits determined by higher layer parameter sl-TimeOffsetEUTRA-
   List, as defined in clause 16.6 of [5, TS 38.213]
   - Carrier indicator -3 bits as defined in 5.3.3.1.9A of [11, TS 36.212].
   - Lowest index of the subchannel allocation to the initial transmission -
   $\lceil \log_2(N_{subchannel}^{SL}) \rceil$ bits as defined in 5.3.3.1.9A of [11, TS 36.212].
   - Frequency resource location of initial transmission and retransmission, as defined in
   5.3.3.1.9A of [11, TS 36.212]
   - Time gap between initial transmission and retransmission, as defined in 5.3.3.1.9A of
   [11, TS 36.212]
   - SL index - 2 bits as defined in 5.3.3.1.9A of [11, TS 36.212]
   - SL SPS configuration index - 3 bits as defined in clause 5.3.3.1.9A of [11, TS
   36.212].
   - Activation/release indication - 1 bit as defined in 5.3.3.1.9A of [11, TS
   36.212].

Referring to FIG. 11B, in an LTE transmission mode 2, an LTE transmission mode 4, or an NR resource allocation mode 2, a UE may determine an SL transmission resource within an SL resource configured by a BS/network or a preconfigured SL resource. For example, the configured SL resource or the preconfigured SL resource may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in the step S8010, the first UE having self-selected a resource in the resource pool may transmit PSCCH (e.g., Side Link Control Information (SCI) or $1^{st}$-stage SCI) to the second UE using the resource. In the step S8020, the first UE may transmit PSSCH (e.g., $2^{nd}$-stage SCI, MAC PDU, data, etc.) related to the PSCCH to the second UE. In the step S8030, the first UE may receive PSFCH related to the PSCCH/PSSCH from the second UE.

Referring to FIG. 11A or FIG. 11B, for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as a $1^{st}$ SCI, a $1^{st}$-stage SCI, or a $1^{st}$-stage SCI format, and the SCI transmitted on the PSSCH may be referred to as a 2nd SCI, a 2nd SCI, a 2nd-stage SCI format. For example, the 1st-stage SCI format may include SCI format 1-A, and the $2^{nd}$-stage SCI format may include SCI format 2-A and/or SCI format 2-B. Table 8 shows one example of a $1^{st}$-stage SCI format.

TABLE 8

8.3.1.1 SCI format 1-A
SCI format 1-A is used for the scheduling of PSSCH and $2^{nd}$-stage-SCI on PSSCH
The following information is transmitted by means of the SCI format 1-A:
- Priority - 3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

- Frequency resource assignment – $\left\lceil \log_2\left(\frac{N^{SL}_{subChannel}(N^{SL}_{subChannel}+1)}{2}\right) \right\rceil$ bits when the value of the higher layer parameter sl-MaxNumPerReserve is configured to 2; otherwise $\left\lceil \log_2\left(\frac{N^{SL}_{subChannel}(N^{SL}_{subChannel}+1)(2N^{SL}_{subChannel}+1)}{6}\right) \right\rceil$ bits when the value of the higher layer parameter sl-MaxNumPerReserve is configured to 3, as defined in clause 8.1.5 of [6, TS 38.214].
- Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].
- Resource reservation period - $\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.
- DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
- $2^{nd}$-stage SCI format - 2 bits as defined in Table 8.3.1.1-1.
- Beta_offset indicator - 2 bits as provided by higher layer parameter sl-BetaOffsets2ndSCI and Table 8.3.1.1-2.
- Number of DMRS port - 1 bit as defined in Table 8.3.1.1-3.
- Modulation and coding scheme - 5 bits as defined in clause 8.1.3 of [6, TS 38.214].
- Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
- PSFCH overhead indication - 1 bit as defined clause 8.1.3.2 of [6, TS 38.214] if higher layer parameter sl-PSFCH-Period = 2 or 4; 0 bit otherwise.
- Reserved - a number of bits as determined by higher layer parameter sl-NumReservedBits, with value set to zero.

Table 9 shows exemplary 2nd-stage SCI formats.

TABLE 9

8.4 Sidelink control information on PSSCH
SCI carried on PSSCH is a 2nd-stage SCI, which transports sidelink scheduling information.
8.4.1 2nd-stage SCI formats
The fields defined in each of the $2^{nd}$-stage SCI formats below are mapped to the information bits $\alpha_0$ to $\alpha_{A-1}$ as follows:
Each field is mapped in the order in which it appears in the description, with the first field mapped to the lowest order information bit $\alpha_0$ and each successive field mapped to higher

TABLE 9-continued order information bits. The most significant bit of each field is mapped to the lowest order information bit for that field, e.g. the most significant bit of the first field is mapped to $\alpha_0$.
8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
- HARQ process number - 4 bits.
- New data indicator - 1 bit.
- Redundancy version - 2 bits as defined in Table 7.3.1.1.1-2.
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1 and in clause 8.1 of [6, TS 38.214].
- CSI request - 1 bit as defined in clause 8.2.1 of [6, TS 38.214] and in clause 8.1 of [6, TS 38.214].

Referring to FIG. 11A or FIG. 11B, in step S8030, a first UE may receive a PSFCH based on Table 10. For example, the first UE and a second UE may determine a PSFCH resource based on Table 10, and the second UE may transmit HARQ feedback to the first UE on the PSFCH resource.

TABLE 10

16.3 UE procedure for reporting HARQ-ACK on sidelink
A UE can be indicated by an SCI format scheduling a PSSCH reception to transmit a PSFCH with HARQ-ACK information in response to the PSSCH reception. The UE provides HARQ-ACK information that includes ACK or NACK, or only NACK.
A UE can be provided, by sl-PSFCH-Period, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k <T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.
A UE is provided by sl-PSFCH-RB-Set a set of $M_{PRB,\,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,\,slot}^{PSFCH}, (i + 1 + j \cdot N_{PSSCH}^{PSFCH}) \cdot M_{subch,\,slot}^{PSFCH} - 1]$ PRBs from the $M_{PRB,\,set}^{PSFCH}$ PRBs to slot i among the PSSCH slots associated with the PSFCH slot and sub-channel j, where $M_{subch,\,slot}^{PSFCH} = M_{PRB,\,set}^{PSFCH}/(N_{subch} \cdot N_{PSSCH}^{PSFCH})$, $0 \le i < N_{PSSCH}^{PSFCH}$, $0 \le i < N_{subch}$, and the allocation starts in an ascending order of i and continues in an ascending order of j. The UE expects that $M_{PRB,\,set}^{PSFCH}$ is a multiple of $N_{subch} \cdot N_{PSSCH}^{PSFCH}$.
The second OFDM symbol l' of PSFCH transmission in a slot is defined as l' = sl-StartSymbol + sl-LengthSymbols − 2 .
A UE determines a number of PSFCH resources available for multiplexing HARQ-ACK information in a PSFCH transmission as $R_{PRB,\,CS}^{PSFCH} = N_{type}^{PSFCH} \cdot M_{subch,\,slot}^{PSFCH} \cdot N_{CS}^{PSFCH}$ where $N_{CS}^{PSFCH}$ is a number of cyclic shift pairs for the resource pool provided by sl-NumMuxCS-Pair and, based on an indication by sl-PSFCH-CandidateResourceType,
  - if sl-PSFCH-CandidateResourceType is configured as startSubCH, $N_{type}^{PSFCH} = 1$ and the $M_{subch,\,slot}^{PSFCH}$ PRBs are associated with the starting sub-channel of the corresponding PSSCH;
  - if sl-PSFCH-CandidateResourceType is configured as allocSubCH, $N_{type}^{PSFCH} = N_{subch}^{PSSCH}$ and the $N_{subch}^{PSSCH} \cdot M_{subch,\,slot}^{PSFCH}$ PRBs are associated with the $N_{subch}^{PSSCH}$ sub-channels of the corresponding PSSCH.
The PSFCH resources are first indexed according to an ascending order of the PRB index, from the $N_{type}^{PSFCH} \cdot M_{subch,\,slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID}) \bmod R_{PRB,\,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1.

Referring to FIG. 11A, in step S8040, the first UE may transmit SL HARQ feedback to the BS over a PUCCH and/or PUSCH based on Table 11.

TABLE 11

16.5 UE procedure for reporting HARQ-ACK on uplink

A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.

For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.

For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.

From a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable

- for one or more PSFCH reception occasions associated with SCI format 2-A with Cast type indicator field value of "10"
    - generate HARQ-ACK information with same value as a value of HARQ-ACK information the UE determines from the last PSFCH reception from the number of PSFCH reception occasions corresponding to PSSCH transmissions or, if the UE determines that a PSFCH is not received at the last PSFCH reception occasion and ACK is not received in any of previous PSFCH reception occasions, generate NACK
- for one or more PSFCH reception occasions associated with SCI format 2-A with Cast type indicator field value of "01"
    - generate ACK if the UE determines ACK from at least one PSFCH reception occasion, from the number of PSFCH reception occasions corresponding to PSSCH transmissions, in PSFCH resources corresponding to every identity $M_{ID}$ of the UEs that the UE expects to receive the PSSCH, as described in clause 16.3; otherwise, generate NACK
- for one or more PSFCH reception occasions associated with SCI format 2-B or SCI format 2-A with Cast type indicator field value of "11"
    - generate ACK when the UE determines absence of PSFCH reception for the last PSFCH reception occasion from the number of PSFCH reception occasions corresponding to PSSCH transmissions; otherwise, generate NACK After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.

The UE generates a NACK when, due to prioritization, as described in clause 16.2.4, the UE does not receive PSFCH in any PSFCH reception occasion associated with a PSSCH transmission in a resource provided by a DCI format 3_0 or, for a configured grant, in a resource provided in a single period and for which the UE is provided a PUCCH resource to report HARQ-ACK information. The priority value of the NACK is same as the priority value of the PSSCH transmission.

The UE generates a NACK when, due to prioritization as described in clause 16.2.4, the UE does not transmit a PSSCH in any of the resources provided by a DCI format 3_0 or, for a configured grant, in any of the resources provided in a single period and for which the UE is provided a PUCCH resource to report HARQ-ACK information. The priority value of the NACK is same as the priority value of the PSSCH that was not transmitted due to prioritization.

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

Table 12 below shows details of selection and reselection of an SL relay UE defined in 3GPP TS 36.331. The contents of Table 12 are used as the prior art of the present disclosure, and related necessary details may be found in 3GPP TS 36.331.

TABLE 12

5.10.11.4 Selection and reselection of sidelink relay UE

A UE capable of sidelink remote UE operation that is configured by upper layers to search for a sidelink relay UE shall:

1> if out of coverage on the frequency used for sidelink communication, as defined in TS 36.304 [4], clause 11.4; or TABLE 12-continued

```
1>  if the serving frequency is used for sidelink communication and the RSRP
    measurement of the cell on which the UE camps (RRC_IDLE)/ the PCell
    (RRC_CONNECTED) is below threshHigh within remoteUE-Config :
    2>  search for candidate sidelink relay UEs, in accordance with TS 36.133 [16]
    2>  when evaluating the one or more detected sidelink relay UEs, apply layer 3
    filtering as specified in 5.5.3.2 across measurements that concern the same ProSe Relay
    UE ID and using the filterCoefficient in SystemInformationBlockType19 (in coverage)
    or the preconfigured filterCoefficient as defined in 9.3(out of coverage), before using
    the SD-RSRP measurement results;
        NOTE 1: The details of the interaction with upper layers are up to UE
        implementation.
    2>  if the UE does not have a selected sidelink relay UE:
        3>  select a candidate sidelink relay UE which SD-RSRP exceeds q-RxLevMin
            included in either reselectionInfoIC (in coverage) or reselectionInfoOoC (out of
            coverage) by minHyst;
    2>  else if SD-RSRP of the currently selected sidelink relay UE is below q-RxLevMin
    included in either reselectionInfoIC (in coverage) or reselectionInfoOoC (out of
    coverage); or if upper layers indicate not to use the currently selected sidelink relay:
    (i.e. sidelink relay UE reselection):
        3>  select a candidate sidelink relay UE which SD-RSRP exceeds q-RxLevMin
            included in either reselectionInfoIC (in coverage) or reselectionInfoOoC (out of
            coverage) by minHyst;
    2>  else if the UE did not detect any candidate sidelink relay UE which SD-RSRP
    exceeds q-RxLevMin included in either reselectionInfoIC (in coverage) or
    reselectionInfoOoC (out of coverage) by minHyst:
        3>  consider no sidelink relay UE to be selected;
        NOTE 2: The UE may perform sidelink relay UE reselection in a manner resulting
        in selection of the sidelink relay UE, amongst all candidate sidelink relay UEs
        meeting higher layer criteria, that has the best radio link quality. Further details,
        including interaction with upper layers, are up to UE implementation.
5.10.11.5   Sidelink remote UE threshold conditions
A UE capable of sidelink remote UE operation shall:
    1>  if the threshold conditions specified in this clause were not met:
        2>  if threshHigh is not included in remoteUE-Config within
SystemInformationBlockType19; or
        2>  if threshHigh is included in remote UE-Config within
SystemInformationBlockType19; and the RSRP measurement of the PCell, or the cell on
which the UE camps, is below threshHigh by hystMax (also included within remoteUE-
Config):
            3>  consider the threshold conditions to be met (entry);
    1>  else:
        2>  if threshHigh is included in remoteUE-Config within
SystemInformationBlockType 19; and the RSRP measurement of the PCell, or the cell on
which the UE camps, is above threshHigh (also included within remoteUE-Config):
            3>  consider the threshold conditions not to be met (leave);
```

Figure 12:
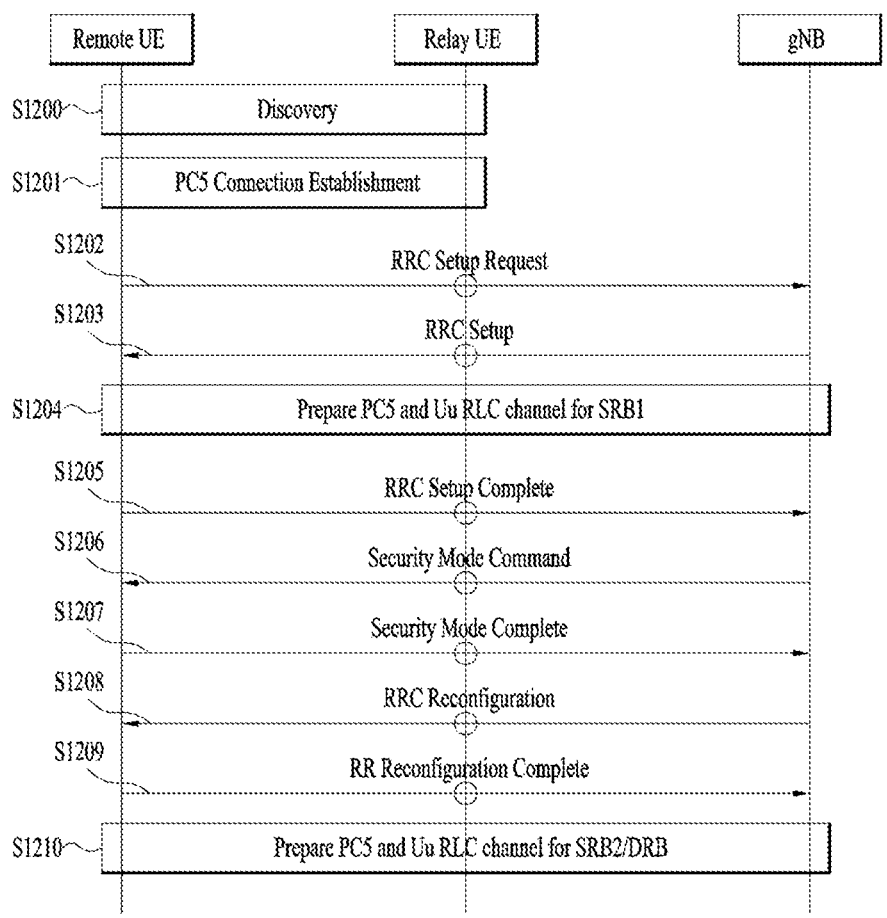
FIG. 12 illustrates a procedure in which a UE performs path switching according to an embodiment of the present disclosure.

FIG. 12 shows a procedure during path switching from direct to indirect connection with a connection management, which is captured from the TR document (3GPP TR 38.836) related to Rel-17 NR SL. A remote UE needs to establish a PDU session/DRB thereof with a network before transmitting user plane data.

A PC5 unicast link establishment procedure in terms of PC5-RRC of Rel-16 NR V2X may be reused to establish a secure unicast link for L2 UE-to-Network relaying between a remote UE and a relay UE before the remote UE establishes Uu RRC connection with a network through the relay UE.

For both in-coverage and out-of-coverage, when the remote UE initiates a first RRC message to establish a connection with a gNB, a PC5 L2 configuration for transmission between the remote UE and the UE-to-Network Relay UE is based on the RLC/MAC configuration defined in the standard. The establishment of Uu SRB1/SRB2 and DRB of the remote UE complies with the legacy Uu configuration procedure for L2 UE-to-Network Relay.

An upper-level connection establishment procedure shown in FIG. 12 is applied to the L2 UE-to-Network Relay.

In step S1201, the remote and relay UE may perform a discovery procedure and may establish PC5-RRC connection based on the existing Rel-16 procedure.

In step S1202, the remote UE may transmit the first RRC message (i.e., RRCSetupRequest) for connection establishment with the gNB through the relay UE using the basic L2 configuration of PC5. The gNB may respond to the remote UE with an RRCSetup message. RRCSetup may be delivered to the remote UE using the default configuration of PC5. If the relay UE is not started in RRC_CONNECTED, connection establishment of the relay UE needs to be performed during message reception for the default L2 configuration of PC5. In this step, details for the relay UE to transmit the RRCSetupRequest/RRCSetup message to the remote UE may be discussed in the WI step.

In operation S1203, the gNB and the relay UE may perform a relay channel establishment procedure through Uu. According to the gNB configuration, the relay/remote UE may establish an RLC channel for relaying SRB1 to the remote UE through PC5. This step may prepare the relay channel for the SRB1.

In operation S1204, the remote UE may transmit a SRB1 message (e.g., RRCSetupComplete message) to the gNB through the relay UE using a SRB1 relay channel. The remote UE may be RRC-connected through Uu.

In operation S1205, the remote UE and gNB may establish security according to the legacy procedure, and a security message may be delivered through the relay UE.

In operation S1206, the gNB may establish an additional RLC channel between the gNB and the relay UE for traffic relay. According to the gNB configuration, the relay/remote UE may establish an additional RLC channel between the remote UE and the relay UE for traffic relay. The gNB may transmit RRCReconfiguration to the remote UE through relay UE to configure relay SRB2/DRB. The remote UE may transmit RRCReconfigurationComplete as a response to the gNB through the relay UE.

In the case of L2 UE-to-Network relay other than the connection establishment procedure:
   The RRC reconfiguration and RRC connection release procedure may reuse the legacy RRC procedure with the message content/configuration design left in the WI step.
   The RRC connection re-establishment and the RRC connection resumption procedure may reuse the existing RRC procedure as a baseline in consideration of the connection establishment procedure of the L2 UE-to-Network Relay above to process a specific part of the relay along with the message content/configuration design. The message content/configuration may be defined later.

Figure 13:
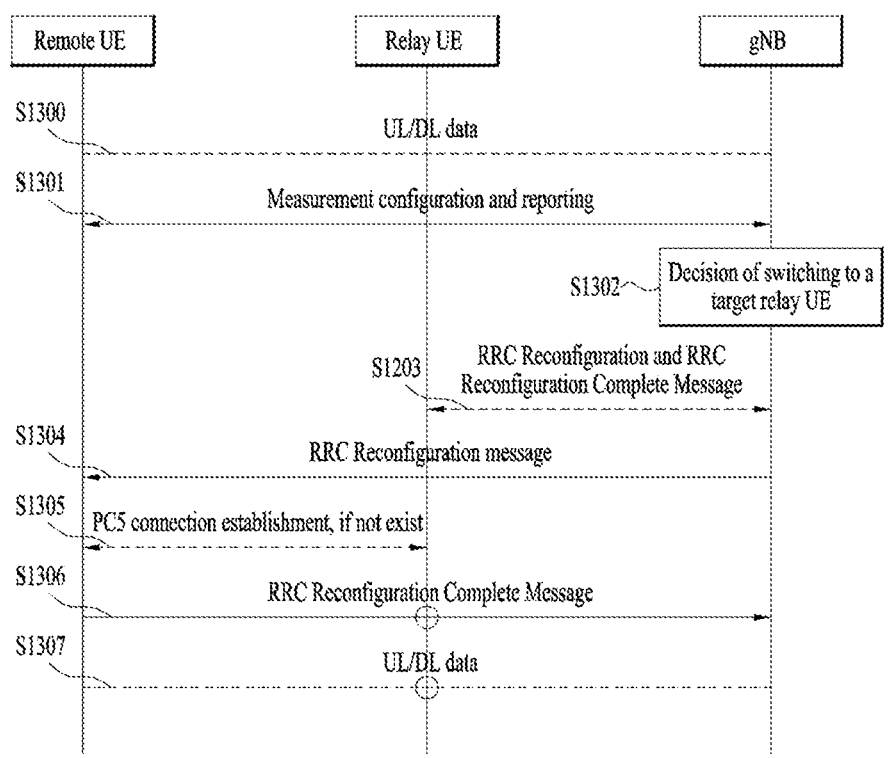
FIG. 13 illustrates switching from a direct path to an indirect path.

FIG. 13 illustrates switching from a direct path to an indirect path. For service continuity of an L2 UE-to-Network relay, the procedure of FIG. 13 may be used when a remote UE switches to an indirect relay UE.

Referring to FIG. 13, in step S1301, a remote UE may report one or multiple candidate relay UEs after measuring/discovering the candidate relay UE(s). The remote UE may filter appropriate relay UEs satisfying higher layer criteria when reporting. The reporting may include the ID of the relay UE and SL RSRP information, where PC5 measurement results may be determined later.

In step S1302, the gNB may decide to switch to a target relay UE and transmit a target (re)configuration to the relay UE optionally.

In step S1304, an RRC Reconfiguration message for the remote UE may include the ID of the target relay UE and a target Uu and PC5 configuration.

In step S1305, if no connection is established, the remote UE may establish a PC5 connection with the target relay UE.

In step S1306, the remote UE may feed back RRCReconfigurationComplete to the gNB via a target path based on the target configuration provided in RRCReconfiguration.

In step S1307, the data path may be switched.

Table 13 below shows the main agreements in 3GPP standard meetings for relay-based discovery.

TABLE 13

For mode 2, if agreed that both shared and dedicated resource pools can be configured, downselect from the following options:
- Left to UE implementation
- Dedicated pool should be prioritized
- Shared pool should be prioritized
[Easy] Proposal 3 (19/20): For relay discovery, dedicated pools can be configured simultaneously with TX shared pool in SIB/RRC/Pre-configuration.
As baseline, TX shared pool can only be used for SL communication in case dedicated and shared pools are configured simultaneously. FFS if network can also configure a setting where both shared and dedicated pools can be used for SL discovery.
For mode 1, if agreed that both shared and dedicated resource pools can be configured, it is up to gNB which one the UE should use to transmit discovery message. For mode 2, if agreed that both shared and dedicated resource pools can be configured, downselect from the following options: a) Left to UE implementation; b) Dedicated pool should be prioritized; c) Shared pool should be prioritized
When UE is configured to transmit discovery, CBR measurements can be performed in dedicated discovery pool or shared pool, based on which pool the UE selects to transmit discovery.
When UE is configured to transmit discovery, in addition to dedicated discovery pool or shared pool, CBR measurements can also be performed in other pools (e.g. tx-PoolMeasToAddModList, sl-TxPoolExceptional) as legacy behaviour in sidelink communication.

Table 14 below shows the content of the contribution document R2-2207765 (On the problem for mode-1 dedicated discovery TX pool, VIVO) submitted at the 3GPP standard meeting, RAN2 119e. Both the content of Table 13 above and the content of Table 14 below are used as the prior art of the present disclosure.

TABLE 14

According to the current TS 38.331 [1], the mode-1 dedicated discovery TX pool was introduced and is specified in sl-DiscTxPoolScheduling as follows:
SL-BWP-DiscPoolConfig information element
-- ASN1START
-- TAG-SL-BWP-DISCPOOLCONFIG-START
SL-BWP-DiscPoolConfig-r17 ::=   SEQUENCE {
    sl-DiscRxPool-r17            SEQUENCE (SIZE (1..maxNrofRXPool-r16)) OF SL-ResourcePool-r16    OPTIONAL,   -- Cond HO
    sl-DiscTxPoolSelected-r17        SL-TxPoolDedicated-r16     OPTIONAL,   -- Need M
    sl-DiscTxPoolScheduling-r17      SL-TxPoolDedicated-r16

TABLE 14-continued

```
OPTIONAL    -- Need N
}
-- TAG-SL-BWP-DISCPOOLCONFIG-STOP
-- ASN1STOP
```
The mode-1 dedicated discovery TX pool, once configured, can be used to transmit discovery
message only, as specified in TS 38.321 [2], including both L2 and L3 relay related discovery
messages as well as non-relay related discovery messages.
Therefore, for an RRC_CONNECTED UE capable of discovery transmission, it should be able
to be configured with the sl-DiscTxPoolScheduling by the gNB to transmit discovery messages
via Mode-1, unless it is a L2 U2N Remote UE connecting to a Relay UE.
Observation 1: Mode-1 dedicated discovery TX pool(s) are specified in sl-
DiscTxPoolScheduling which was introduced for the gNB to schedule dedicated resources to a
mode-1 UE for both relay-related and non-relay related SL discovery transmission.
On the other hand, however, the current Spec cannot support the gNB to schedule any resources
in a pool indicated by sl-DiscTxPoolScheduling, due to the DCI Format 3_1 specified in the
current TS 38.212 [3] or in the table 7:
Specifically, the field "Resource pool index" cannot refer to any pool configured by sl-
DiscTxPoolScheduling, but still refers to only the pools in sl-TxPoolScheduling as inherited
from Rel-16 Spec. That is, RAN1 Spec failed to make necessary changes adaptive to the mode-
1 dedicated discovery TX pool introduced by RAN2, so such mode-1 dedicated discovery TX
pool(s) cannot actually work till now, even if they are now specified in the RRC specification.
Observation 2: As per the current Spec, the gNB is unable to schedule any resource in the
pool(s) configured by sl-DiscTxPoolScheduling (even if configured), since the "Resource pool
index" field in DCI format 3_0 is currently unable to refer to any pool within sl-
DiscTxPoolScheduling.
Above observation 1 and 2 mean that there is mismatch between RAN2 Specs and RAN1 Specs.
The main reason for such mismatch could be that without a transport channel/physical channel
introduced specifically for discovery transmission as in LTE D2D, whether an NR SL
transmission is for discovery or for communication is now invisible in the PHY layer as per
RAN1 design, which may assume that there is no need to distinguish resources dedicated to SL
discovery transmissions and those dedicated to SL communication transmissions either.
However, during R17 SL Relay discussion, RAN2 alternatively saw the benefits and thus
decided to introduce the mode-1 dedicated discovery TX pool, which, however, needs at least
the DCI for mode-1 to be extended to support the scheduling in such dedicated TX pools for SL
discovery transmission. Such a mismatch between RAN1 design and RAN2 design finally
results in the mismatch between RAN1 Specs and RAN2 specs.
There could be some ways to resolve the issues by making necessary changes to DCI Format
3_0, e.g. redefining/extending the "Resource pool index" field, etc., and the main impacts should
be in the RAN1 Specs. However, since the introduction of sl-DiscTxPoolScheduling was
completely decided by RAN2 (w/o consulting RAN1's views) and RAN1 design and RAN2
design on resources used for SL discovery vs. SL communication transmissions did not follow
completely aligned understanding, it is RAN2's responsibility to inform RAN1 of the
introduction of such sl-DiscTxPoolScheduling, and the resultant Spec mismatch as shown above
in Observation 1 and 2. Also, RAN2 may need to inform RAN1 of the possible use cases that
could be supported for such sl-DiscTxPoolScheduling configuration, as they may impact how
RAN1 decides to change DCI finally. For example, the UE may be configured with sl-
DiscTxPoolScheduling:
when the UE is configured to transmit only NR SL discovery; or
when the UE is configured to transmit both NR SL discovery and NR SL
communication.
Whereas in the former case the UE may be configured with only sl-DiscTxPoolScheduling to
which the "Resource pool index" field needs to refer, in the latter case the UE can be configured
with both sl-DiscTxPoolScheduling and sl-TxPoolScheduling to which the "Resource pool
index" field needs to refer jointly. Since such use cases are up to upper layer configuration which
is usually invisible to RAN1, RAN2 should tell RAN1 about such information which can
provide necessary guidance to RAN1 on how to change properly.
Proposal 1: Send LS to RAN1, informing RAN1 of the introduction of mode-1 dedicated
discovery TX pool (i.e. sl-DiscTxPoolScheduling) and the problem that current DCI for mode-1
fails to schedule the resources therein. Ask RAN1 to find a solution to resolve the problem.
Proposal 1a. Also inform RAN1 in the LS of the use cases that the sl-DiscTxPoolScheduling can
be configured, including the case that the UE is configured to transmit only NR SL discovery,
and the case that the UE is configured to transmit both NR SL discovery and NR SL
communication.
A draft LS is provided in [4]. RAN2 is asked to adopt the draft LS in [4] in case above proposals
can be agreed.
1. Conclusion
In this paper, we discuss a technical problem for the mode-1 dedicated discovery TX pool
configured in sl-DiscTxPoolScheduling. The problem is shown by the following Observations:
Observation 1: Mode-1 dedicated discovery TX pool(s) are specified in sl-
DiscTxPoolScheduling which was introduced for the gNB to schedule dedicated resources to a
mode-1 UE for both relay-related and non-relay related SL discovery transmission.
Observation 2: As per the current Spec, the gNB is unable to schedule any resource in the
pool(s) configured by sl-DiscTxPoolScheduling (even if configured), since the "Resource pool
index" field in DCI format 3_0 is currently unable to refer to any pool within sl-
DiscTxPoolScheduling.
Proposals are listed as follows on how to resolve the above problem from a RAN2 perspective:
Proposal 1: Send LS to RAN1, informing RAN1 of the introduction of mode-1 dedicated
discovery TX pool (i.e. sl-DiscTxPoolScheduling) and the problem that current DCI for mode-1
fails to schedule the resources therein. Ask RAN1 to find a solution to resolve the problem.

TABLE 14-continued

Proposal 1a. Also inform RAN1 in the LS of the use cases that the sl-DiscTxPoolScheduling can be configured, including the case that the UE is configured to transmit only NR SL discovery, and the case that the UE is configured to transmit both NR SL discovery and NR SL communication.
RAN2 is also suggested to adopt the draft LS provided in [4], if above proposals are agreeable.

According to the prior art, a discovery message (for relay transmission) may be transmitted in a discovery dedicated resource pool and a shared resource pool. When the discovery dedicated resource pool is used, the discovery messages may be transmitted only in the discovery dedicated resource pool. When the shared resource pool is used, the discovery message is transmitted in the same resource pool as a communication message.

When the discovery dedicated resource pool is used, if the UE is in the RRC_CONNECTED state and operates in mode-1, the BS may configure sl-DiscTxPoolScheduling. The following embodiment of the present disclosures provide methods of allocating resources when a discovery dedicated resource pool is used. Specifically, there are proposed a method of mapping a resource pool index transmitted in DCI and an actual resource pool ID and an interpretation method when a dedicated resource pool and a communication resource pool are configured.

Figure 14:
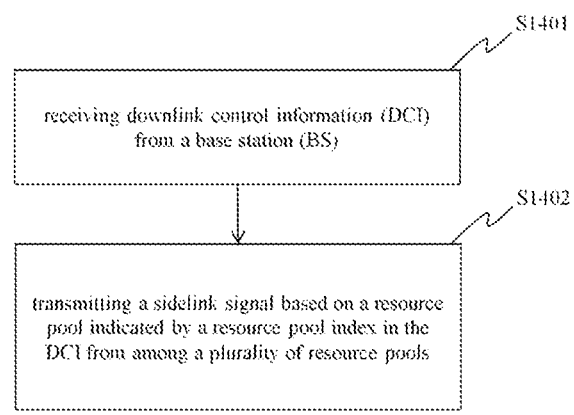
FIG. 14 is a diagram for explaining an embodiment.

According to an embodiment, the UE may receive DCI from the BS (S1401 in FIG. 14). The UE may transmit an SL signal based on a resource pool indicated by a resource pool index in the DCI from among a plurality of resource pools (S1402).

Based on that a resource pool related to NR SL discovery and a resource pool related to NR SL communication transmission are configured together in the plurality of resource pools, the resource pool index may indicate one resource pool among all resource pools included in the resource pool related to NR SL communication transmission and the resource pool related to NR SL discovery.

In other words, when the ID of a communication resource pool and the ID of a dedicated resource pool overlap in DCI, the total resource pool indices may be determined based on the sum of the number of communication resource pools and the number of dedicated resource pools. Once the size and indices of all resource pools are determined, resource pool IDs may be matched with the resource pools such that the communication resource pool ID and the dedicated resource pool ID do not overlap with each other.

That is, the size of resource pools included in the entire resource pool may be the sum of the number of resource pools related to NR SL communication transmission and the number of resource pools related to NR SL discovery. For example, if the resource pools related to NR SL communication transmission includes three resource pools and the resource pools related to NR SL discovery includes four resource pools, the size of the entire resource pool is equivalent to the sum of the resource pools included in each resource pool, that is, seven resource pools. In this case, the resource pools included in the entire resource pool may sequentially indexed as follows: 0, 1, 2, and 3 from the resource pools related to NR SL communication transmission to the resource pools related to NR SL discovery. In addition, the resource pool indices included in the DCI may indicate the indexed resource pools.

For example, communication resource pool IDs may be ID_2, ID_3, and ID_4, and dedicated resource pool IDs may be ID_1 and ID_2. In this case, the total resource pool indices may be $\lceil \log_2 (3+2) \rceil$), that is, three bits. Thus, the resource pool indices may include "000", "001", "010", "011", "100", "101", "110", and "111". Resource pool IDs may be mapped to the corresponding resource pool indices such that there is no overlap. For example, a rule may be established to position the communication resource pool IDs either before or after the dedicated resource pool IDs. Alternatively, the arrangement may be configured by the gNB, or the IDs may be mapped to predetermined locations. For the same resource pool ID, the order may be determined either in ascending or descending order of IDs, or the mapping relationship between the resource pool indices and resource pool IDs may be configured (or preconfigured). Specifically, if the communication resource pool IDs are positioned before the dedicated resource pool IDs, and for the same resource pool, the mapping is defined in ascending order of IDs, the following mapping relationship may be established.

"000": communication resource pool ID_2
"001": communication resource pool ID_3
"010": communication resource pool ID_4
"011": dedicated resource pool ID_1
"100": dedicated resource pool ID_2

The size of a resource pool index in DCI is determined based on the number of configured pools, I ($\lceil log2I \rceil$). For example, if the number of configured pools is 3, the size of the resource pool index may be 2. The resource pool index may have the number of bits corresponding to the logarithm of the size of resource pools included in the entire resource pool.

The above description may be applied not only to cases where the dedicated resource pool ID (sl-DiscTxPoolScheduling) and the communication resource pool ID (sl-TxPoolScheduling) do not overlap with each other but also to cases where the dedicated resource pool ID and the communication resource pool ID may overlap with each other. For instance, when a specific resource pool includes a total of 10 resource pools, there may be some overlap between the dedicated resource pool ID and the communication resource pool ID. In this case, if the IDs assigned to each resource pool are used as it is for the entire resource pool, there may be an issue in that one ID indicates two different resource pools. This issue may be addressed by setting the size of the resource pools included in the entire resource pool to be the sum of the number of resource pools related to NR SL communication transmission and the number of resource pools related to NR SL discovery and indexing each resource pool as described in the above embodiment.

The resource pool related to NR SL discovery may correspond to a dedicated resource pool. In other words, the resource pool related to NR SL discovery may constitute the dedicated resource pool along with the resource pool related to NR SL communication transmission.

The UE operates in SL transmission mode 1, and the UE is in the RRC_CONNECTED state.

The resource pool related to NR SL communication transmission may be configured by the sl-TxPoolScheduling information element, and the resource pool related to NR SL discovery may be configured by the sl-DiscTxPoolScheduling information element.

Tables 15 and 16 show the sl-DiscTxPoolScheduling information element and the sl-TxPoolScheduling information element, which are defined in TS 38.331, respectively.

TABLE 15

SL-BWP-DiscPoolConfig
The IE SL-BWP-DiscPoolConfig is used to configure UE specific NR sidelink discovery dedicated resource pool.
SL-BWP-DiscPoolConfig information element
-- ASN1START
-- TAG-SL-BWP-DISCPOOLCONFIG-START
SL-BWP-DiscPoolConfig-r17 ::=      SEQUENCE {
   sl-DiscRxPool-r17             SEQUENCE (SIZE (1..maxNrofRXPool-r16)) OF SL-ResourcePool-r16      OPTIONAL,   -- Cond HO
   sl-DiscTxPoolSelected-r17        SL-TxPoolDedicated-r16           OPTIONAL,   -- Need M
   sl-DiscTxPoolScheduling-r17       SL-TxPoolDedicated-r16           OPTIONAL    -- Need N
}
-- TAG-SL-BWP-DISCPOOLCONFIG-STOP
-- ASN1STOP
SL-BWP-DiscPoolConfig field descriptions
sl-DiscTxPoolScheduling
Indicates the resources by which the UE is allowed to transmit NR sidelink discovery based on network scheduling on the configured BWP. For the PSFCH related configuration, if configured, will be used for PSFCH transmission/reception.
When this field is configured together with sl-TxPoolScheduling, the resource pool index (which is used in DCI Format 3_0 in TS 38.212 [17], clause 7.3.1.4.1) is defined as 0, 1, . . . , x − 1 for the resource pools included in the sl-TxPoolScheduling, and x, x + 1, . . . , x + y − 1 for the resource pools included in sl-DiscTxPoolScheduling, where x is the number of the resource pools in sl-TxPoolScheduling, and y is the number of resource pools in sl-DiscTxPoolScheduling.

TABLE 16

SL-BWP-PoolConfig
The IE SL-BWP-PoolConfig is used to configure NR sidelink communication resource pool.
SL-BWP-PoolConfig information element
-- ASN1START
-- TAG-SL-BWP-POOLCONFIG-START
SL-BWP-PoolConfig-r16 ::=      SEQUENCE {
   sl-RxPool-r16             SEQUENCE (SIZE (1..maxNrofRXPool-r16)) OF SL-ResourcePool-r16      OPTIONAL,   -- Cond HO
   sl-TxPoolSelectedNormal-r16   SL-TxPoolDedicated-r16           OPTIONAL,   -- Need M
   sl-TxPoolScheduling-r16       SL-TxPoolDedicated-r16           OPTIONAL,   -- Need N
   sl-TxPoolExceptional-r16       SL-ResourcePoolConfig-r16       OPTIONAL    -- Need M
}
SL-TxPoolDedicated-r16 ::=       SEQUENCE {
   sl-PoolToReleaseList-r16          SEQUENCE (SIZE (1..maxNrofTXPool-r16)) OF SL-ResourcePoolID-r16      OPTIONAL,   -- Need N
   sl-PoolToAddModList-r16         SEQUENCE (SIZE (1..maxNrofTXPool-r16)) OF SL-ResourcePoolConfig-r16 OPTIONAL    -- Need N
}
SL-ResourcePoolConfig-r16 ::=    SEQUENCE {
   sl-ResourcePoolID-r16         SL-ResourcePoolID-r16,
   sl-ResourcePool-r16          SL-ResourcePool-r16           OPTIONAL    -- Need M
}
SL-ResourcePoolID-r16 ::=     INTEGER (1..maxNrofPoolID-r16)
-- TAG-SL-BWP-POOLCONFIG-STOP
-- ASN1STOP
SL-BWP-PoolConfig field descriptions
sl-RxPool
Indicates the receiving resource pool on the configured BWP. For the PSFCH related configuration, if configured, will be used for PSFCH transmission/reception. If the field is included, it replaces any previous list, i.e. all the entries of the list are replaced and each of the SL-ResourcePool entries is considered to be newly created.
sl-TxPoolExceptional
Indicates the resources by which the UE is allowed to perform NR sidelink transmission in exceptional conditions on the configured BWP. For the PSFCH related configuration, if configured, will be used for PSFCH transmission/reception.
sl-TxPoolScheduling
Indicates the resources by which the UE is allowed to perform NR sidelink transmission based on network scheduling on the configured BWP. For the PSFCH related configuration, if TABLE 16-continued configured, will be used for PSFCH transmission/reception.
sl-TxPoolSelectedNormal
Indicates the resources by which the UE is allowed to perform NR sidelink transmission by UE autonomous resource selection on the configured BWP. For the PSFCH related configuration, if configured, will be used for PSFCH transmission/reception.

The DCI is received over a PSCCH, and the sidelink signal is one of an NR sidelink communication signal and an NR sidelink discovery signal. The DCI may be DCI format 3_0.

As another example, when a dedicated discovery pool is configured, the dedicated resource pool ID (sl-DiscTx-PoolScheduling) and the communication resource pool ID (sl-TxPoolScheduling) need to be configured such that the IDs do not overlap with each other in order to prevent errors in interpreting a resource pool index field in mode 1 DCI. In this case, the size of the resource pool index field is determined based on the sum of the number of configured discovery dedicated resource pools and the number of configured communication resource pools.

On the other hand, when no dedicated resource pool is configured (i.e., when discovery and communication messages are allowed to be transmitted in a shared pool), the aforementioned restrictions are not applied (for example, the size of a resource pool field in mode 1 DCI and the target resource pool scheduled by the mode 1 DCI are determined based on the number of pools and ID assignment, which are configured by the parameter sl-TxPoolScheduling).

In relation to the above description, a UE is provided. The UE may include: at least one processor; and at least one computer memory operably connected to the at least one processor and configured to store instructions that, when executed, cause the at least one processor to perform operations. The operations may include: receiving, by the UE, DCI from a BS; transmitting, by the UE, a sidelink signal based on a resource pool indicated by a resource pool index in the DCI from among a plurality of resource pools. Based on that resource pools related to NR sidelink discovery and resource pools related to NR sidelink communication transmission are configured together in the plurality of resource pools, the resource pool index may indicate one resource pool among all resource pools included in the resource pools related to NR sidelink communication transmission and the resource pools related to NR sidelink discovery.

The UE may communicate with at least one of another UE, a UE or BS related to autonomous vehicles, or a network.

In addition, there is provided a non-volatile computer-readable storage medium configured to store at least one computer program including instructions that, when executed by at least one processor, cause the at least one processor to perform operations for a UE. The operations may include: receiving, by the UE, DCI from a BS; transmitting, by the UE, a sidelink signal based on a resource pool indicated by a resource pool index in the DCI from among a plurality of resource pools. Based on that resource pools related to NR sidelink discovery and resource pools related to NR sidelink communication transmission are configured together in the plurality of resource pools, the resource pool index may indicate one resource pool among all resource pools included in the resource pools related to NR sidelink communication transmission and the resource pools related to NR sidelink discovery.

In the above description, the relay UE may be interpreted as a gNB, an integrated access backhaul (IAB) node, and so on.

In the prior art, when resource pool allocation is performed at the physical layer, it is only defined for the allocation of communication resource pools. However, according to the description provided above, handing of resource pool indices may be clearly defined when a discovery messages is transmitted in a dedicated resource pool. In addition, when a discovery dedicated resource pool is configured, the total resource pool indices may be determined based on the sum of the number of communication resource pools and the number of dedicated resource pools, thereby enabling the mapping of resource pool IDs such that the ID of a communication resource pool and the ID of a dedicated resource pool do not overlap with each other.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
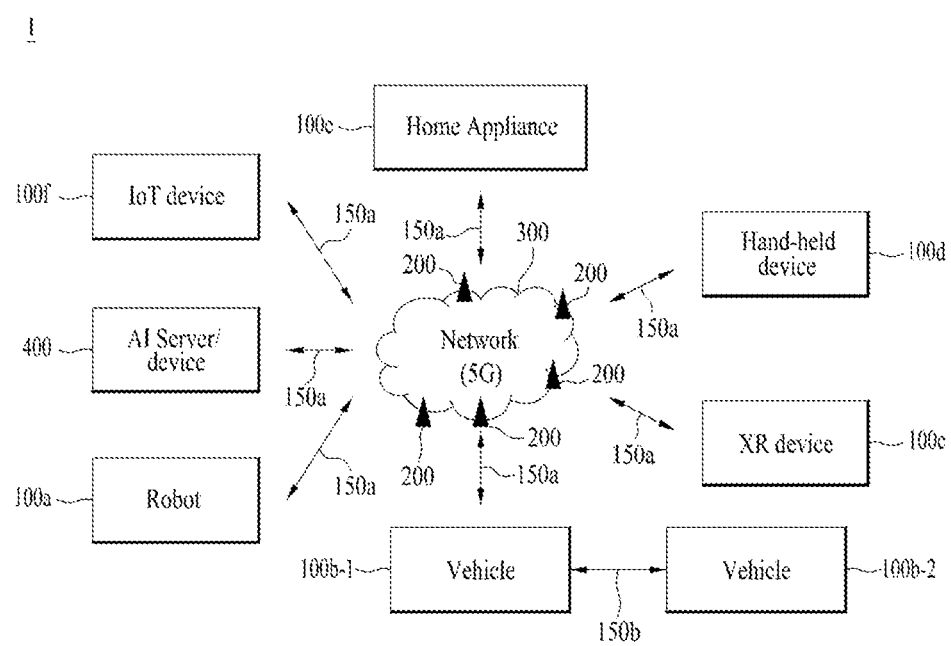
FIGS. 15 to 21 are diagrams for explaining various devices to which embodiment(s) are applicable.

FIG. 15 illustrates a communication system 1 applied to the present disclosure.

Referring to FIG. 15, a communication system 1 applied to the present disclosure includes wireless devices, BS s, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 16:
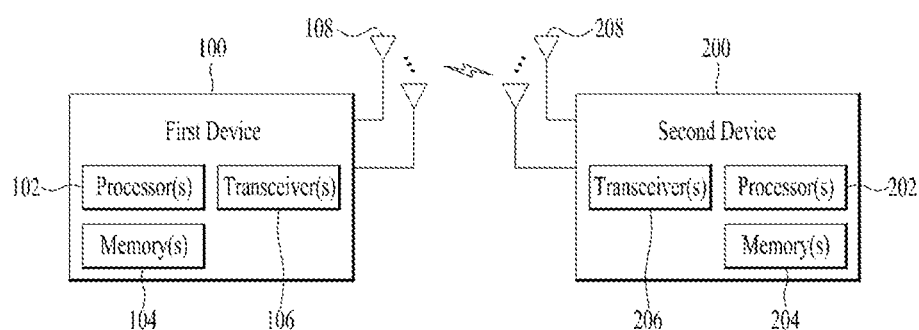

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
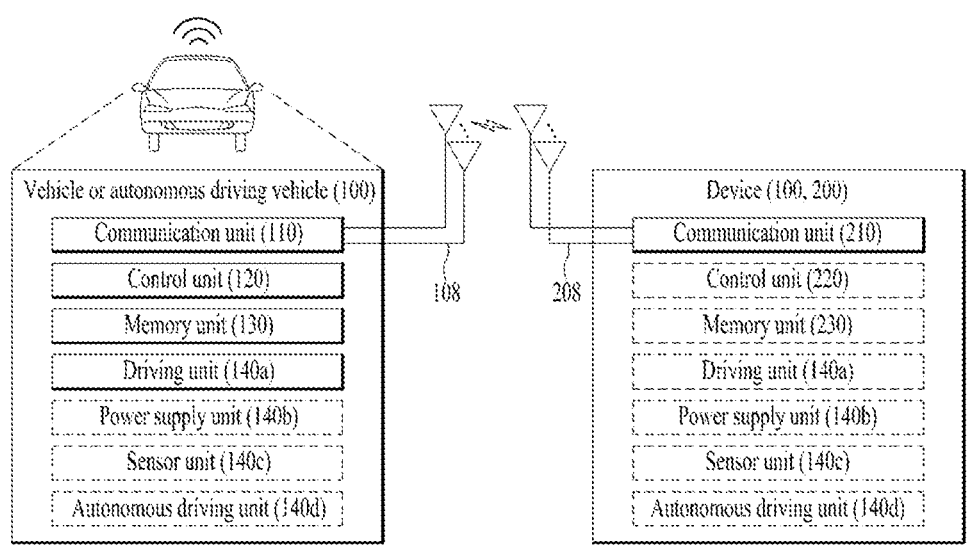

Examples of a Vehicle or an Autonomous Driving Vehicle Applicable to the Present Disclosure FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNB s and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 18:
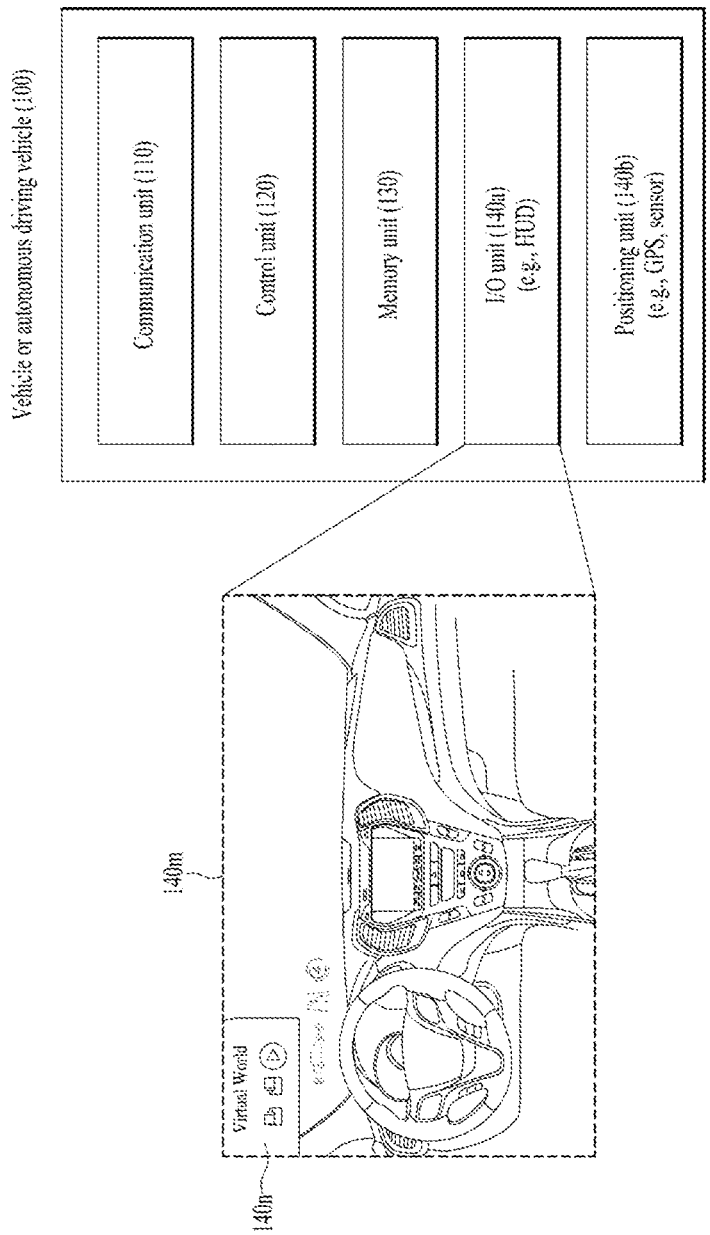

FIG. 18 illustrates a vehicle applied to the present disclosure. The vehicle may be implemented as a transport means, an aerial vehicle, a ship, etc.

Referring to FIG. 18, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 19:
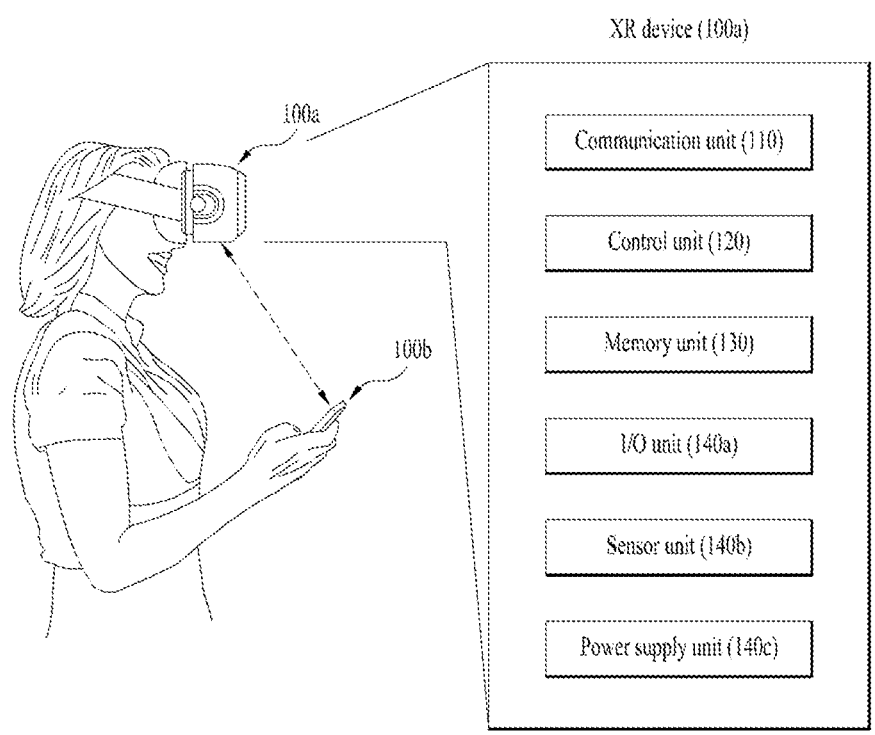

FIG. 19 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 19, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 20:
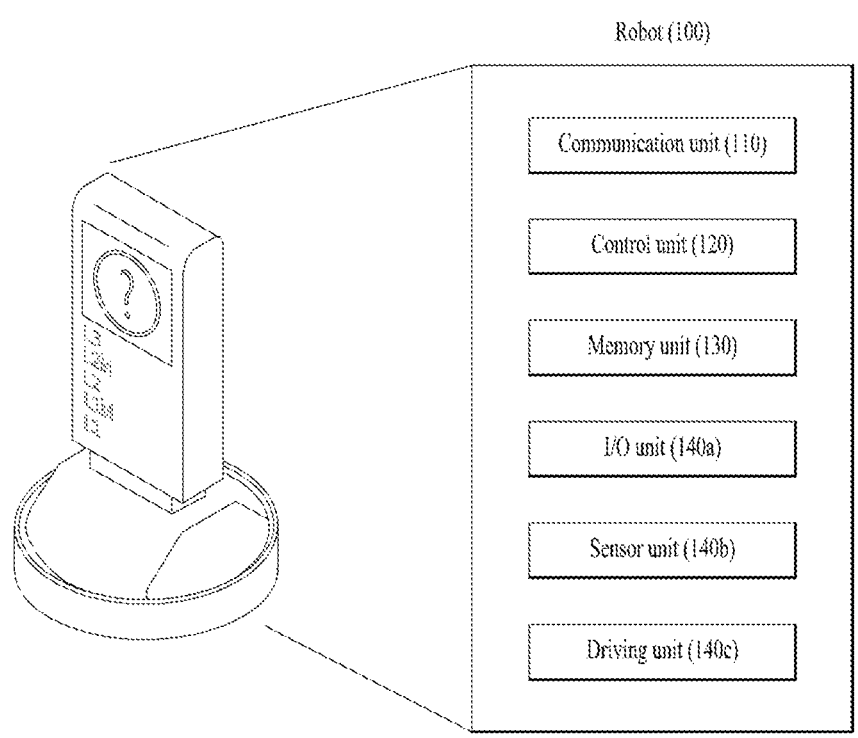

FIG. 20 illustrates a robot applied to the present disclosure. The robot may be categorized into an industrial robot, a medical robot, a household robot, a military robot, etc., according to a used purpose or field.

Referring to FIG. 20, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 21:
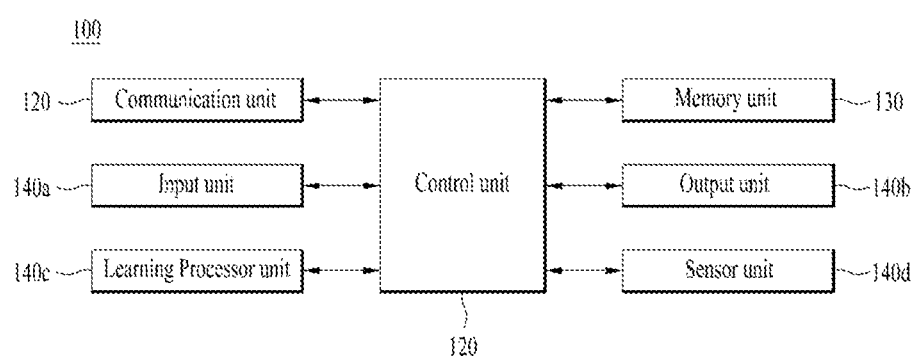

FIG. 21 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 21, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100x, 200, or 400 of FIG. 15) or an AI server (e.g., 400 of FIG. 15) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 15). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 15). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

What is claimed is:

1. A method of operating a user equipment (UE) in a wireless communication system, the method comprising:
   receiving, by the UE, downlink control information (DCI) from a base station (BS); and
   transmitting, by the UE, a sidelink signal based on a resource pool indicated by a resource pool index in the DCI from among a plurality of resource pools, wherein based on that resource pools related to New Radio (NR) sidelink discovery and resource pools related to NR sidelink communication transmission are configured together, the resource pool index indicates one resource pool among the plurality of resource pools, and wherein a number of the plurality of resource pools is a sum of a number of resource pools in the resource pools related to NR sidelink discovery and a number of resource pools in the resource pools related to NR sidelink communication transmission.

2. The method of claim 1, wherein a size of all resource pools is equivalent to a sum of a number of the resource pools related to NR sidelink communication and a number of the resource pools related to NR sidelink discovery.

3. The method of claim 1, wherein the resource pools related to NR sidelink discovery correspond to a dedicated resource pool.

4. The method of claim 1, wherein the UE operates in sidelink transmission mode 1.

5. The method of claim 1, wherein the UE is in a radio resource control connected (RRC_CONNECTED) state.

6. The method of claim 1, wherein the resource pools related to NR sidelink communication are configured by an sl-DiscTxPoolScheduling information element, and wherein the resource pools related to NR sidelink discovery are configured by an sl-TxPoolScheduling information element.

7. The method of claim 1, wherein the DCI is received over a physical sidelink control channel (PSCCH).

8. The method of claim 1, wherein the sidelink signal is either an NR sidelink communication signal or an NR sidelink discovery signal.

9. The method of claim 1, wherein the DCI is DCI format 3_0.

10. A user equipment (UE) configured to operate in a wireless communication system, the UE comprising:
    at least one processor; and
    at least one computer memory operably connected to the at least one processor and configured to store instructions that, when executed, cause the at least one processor to perform operations comprising:
        receiving, by the UE, downlink control information (DCI) from a base station (BS); and
        determining, by the UE, a resource pool indicated by a resource pool index in the DCI from among a plurality of resource pools,
        wherein based on that resource pools related to New Radio (NR) sidelink discovery and resource pools related to NR sidelink communication transmission are configured together, the resource pool index indicates one resource pool among the plurality of resource pools, and
        wherein a number of the plurality of resource pools is a sum of a number of resource pools in the resource pools related to NR sidelink discovery and a number of resource pools in the resource pools related to NR sidelink communication transmission.

11. The UE of claim 10, wherein the UE communicates with at least one of another UE, a UE or BS related to autonomous vehicles, or a network.

12. A non-volatile computer-readable storage medium storing at least one computer program comprising instructions that, when executed by at least one processor, cause the at least one processor to perform operations for a user equipment (UE), the operations comprising:
    receiving, by the UE, downlink control information (DCI) from a base station (BS); and,
    determining, by the UE, a resource pool indicated by a resource pool index in the DCI from among a plurality of resource pools,
    wherein based on that resource pools related to New Radio (NR) sidelink discovery and resource pools related to NR sidelink communication transmission are configured together, the resource pool index indicates one resource pool among the plurality of resource pools, and
    wherein a number of the plurality of resource pools is a sum of a number of resource pools in the resource pools related to NR sidelink discovery and a number of resource pools in the resource pools related to NR sidelink communication transmission.

* * * * *